(12) United States Patent
Ishii

(10) Patent No.: US 11,362,533 B2
(45) Date of Patent: Jun. 14, 2022

(54) PRINTING APPARATUS

(71) Applicant: BROTHER KOGYO KABUSHIKI KAISHA, Nagoya (JP)

(72) Inventor: Hidekazu Ishii, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 134 days.

(21) Appl. No.: 16/575,339

(22) Filed: Sep. 18, 2019

(65) Prior Publication Data
US 2020/0099228 A1 Mar. 26, 2020

(30) Foreign Application Priority Data
Sep. 26, 2018 (JP) .............................. JP2018-181081

(51) Int. Cl.
H02J 7/00 (2006.01)

(52) U.S. Cl.
CPC .............. *H02J 7/007* (2013.01); *H02J 7/005* (2020.01); *H02J 7/0036* (2013.01); *H02J 7/00* (2013.01); *H02J 2207/40* (2020.01)

(58) Field of Classification Search
CPC ........ H02J 7/007; H02J 7/0036; H02J 7/0052; H02J 2207/40; H02J 7/005
USPC ........ 320/107, 114, 115, 132, 134, 136, 153
See application file for complete search history.

(56) References Cited

U.S. PATENT DOCUMENTS

| | | | |
|---|---|---|---|
| 2013/0096858 A1* | 4/2013 | Amano | G01R 31/392 702/63 |
| 2014/0043422 A1* | 2/2014 | Takahashi | B41J 29/04 347/171 |
| 2016/0172886 A1* | 6/2016 | Keates | H02J 7/00 320/130 |
| 2016/0377686 A1* | 12/2016 | Uchida | G01R 31/3842 702/63 |

FOREIGN PATENT DOCUMENTS

| | | |
|---|---|---|
| JP | 6-121466 A | 4/1994 |
| JP | 6-233471 A | 8/1994 |

* cited by examiner

*Primary Examiner* — Edward Tso
*Assistant Examiner* — Aaron Piggush
(74) *Attorney, Agent, or Firm* — Kenealy Vaidya LLP

(57) ABSTRACT

A printing apparatus includes: a battery accommodating portion; a conveyor; a printing device; a power-source connector; an electric charger that charges the battery power source from an external power source when the power-source connector is connected to the external power source; and a degradation-degree detector that detects a degradation degree of the battery power source. A controller executes: a charge processing for controlling the electric charger using at least one charge parameter to charge the battery power source; storing data on the degradation degree of the battery power source based on a result of detection of the degradation-degree detector; a determining processing for determining whether a particular determination criterion relating to the degradation degree is satisfied in the stored data; and correcting the at least one charge parameter in accordance with a result of determination in the determining processing.

10 Claims, 14 Drawing Sheets

FIG.9

| TEMPERATURE (°C) | 35 | 37 | 40 | 42 | 44 | 45 | 48 | 50 | 48 | 50 | 48 | 50 | ... |
|---|---|---|---|---|---|---|---|---|---|---|---|---|---|
| DEGRADATION DEGREE (%) | 0.05 | 0.05 | 0.05 | 0.05 | 0.05 | 0.05 | 0.06 | 0.06 | 0.06 | 0.06 | 0.06 | 0.07 | |

FIG.12

| TIME | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| REMOVALS | 0 | 0 | 0 | 0 | 0 | 0 | 80 | 10 | 6 | 0 | 0 | 20 | 3 | 40 | 20 | 23 | 26 | 27 | 25 | 28 | 11 | 10 | 6 | 3 |

PRINTING APPARATUS

CROSS REFERENCE TO RELATED APPLICATION

The present application claims priority from Japanese Patent Application No. 2018-181081, which was filed on Sep. 26, 2018, the disclosure of which is herein incorporated by reference in its entirety.

BACKGROUND

The following disclosure relates to a printing apparatus and particularly to a printing apparatus with a chargeable battery power source for driving a drive system.

There is conventionally known a technique in which a battery power source is charged using a commercial power source, and a drive system is driven by electric power supplied from the charged battery power source.

For charging the battery power source, there are known (i) a charging method of detecting the present voltage value of the battery power source as a material to be charged and automatically charging the battery power source for an appropriate charge time, based on the present voltage value or a charge time corresponding to the present voltage value and (ii) an electric-charge system configured to charge the battery power source in accordance with a battery temperature and an electric state of the battery, while an output terminal for both of a battery-state detector and a battery-temperature detector distinguishes between signals output from the battery-state detector and the battery-temperature detector.

SUMMARY

In the above-described techniques, however, the electric charge is performed based on predetermined charge parameters regardless of a state of the battery power source. In other words, conditions of termination of the electric charge or conditions of interruption of the electric charge are fixed. Incidentally, even in the case of battery power sources according to the same standard, characteristics of the battery power source are different depending upon, e.g., manufacturers. Also, age deterioration is caused in each battery power source. Thus, if an electric charge is performed under the same condition at every time, an optical electric charge cannot be performed, resulting in reduction in useful life of the battery power source.

The following is one example of charge parameters in the case of a printing apparatus:

Battery Power Source: 3.0-8.4 V (voltage values for charge);
  Slow-charge Current Value: 100 mA;
  Fast-charge Current Value: 1000 mA;
  Voltage Range in Fast Charge: 3.0-8.3 V;
  Voltage Range in Slow Charge: 8.3-8.4 V; and
  Chargeable Temperature: 20-50° C.

It is noted that the above-described conditions may vary depending upon output values, types, and so on (including an error) according to the standard of the battery power source.

Accordingly, an aspect of the disclosure relates to a printing apparatus capable of reducing the progress of deterioration of a battery power source.

In one aspect of the disclosure, a printing apparatus includes: a battery accommodating portion configured to hold a battery power source that is chargeable; a conveyor configured to be operable by electric power supplied from the battery power source, to convey a printing medium; a printing device configured to be operable by electric power supplied from the battery power source, to perform printing on the conveyed printing medium; a power-source connector configured to be connectable to an external power source; an electric charger configured to charge the battery power source from the external power source when the power-source connector is connected to the external power source; a degradation-degree detector configured to detect a degradation degree of the battery power source held in the battery accommodating portion; and a controller configured to execute: a charge processing in which the controller controls the electric charger using at least one charge parameter to charge the battery power source; a degradation-degree-data storing processing in which the controller stores data on the degradation degree of the battery power source based on a result of detection of the degradation-degree detector; a determining processing in which the controller determines whether a particular determination criterion relating to the degradation degree is satisfied in the data on the degradation degree which is stored in the degradation-degree-data storing processing; and a correcting processing in which the controller corrects the at least one charge parameter for the charge processing in accordance with a result of determination in the determining processing.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 9 is one example of numbers representing a temperature of the battery power source in charging and the degradation degree which are stored on a time series basis;

FIG. 12 is a table representing a usage history based on a relationship between a time period and the number of removals of a power-source adapter;

EMBODIMENTS

First Embodiment

Hereinafter, there will be described embodiments by reference to the drawings.

Figure 1:
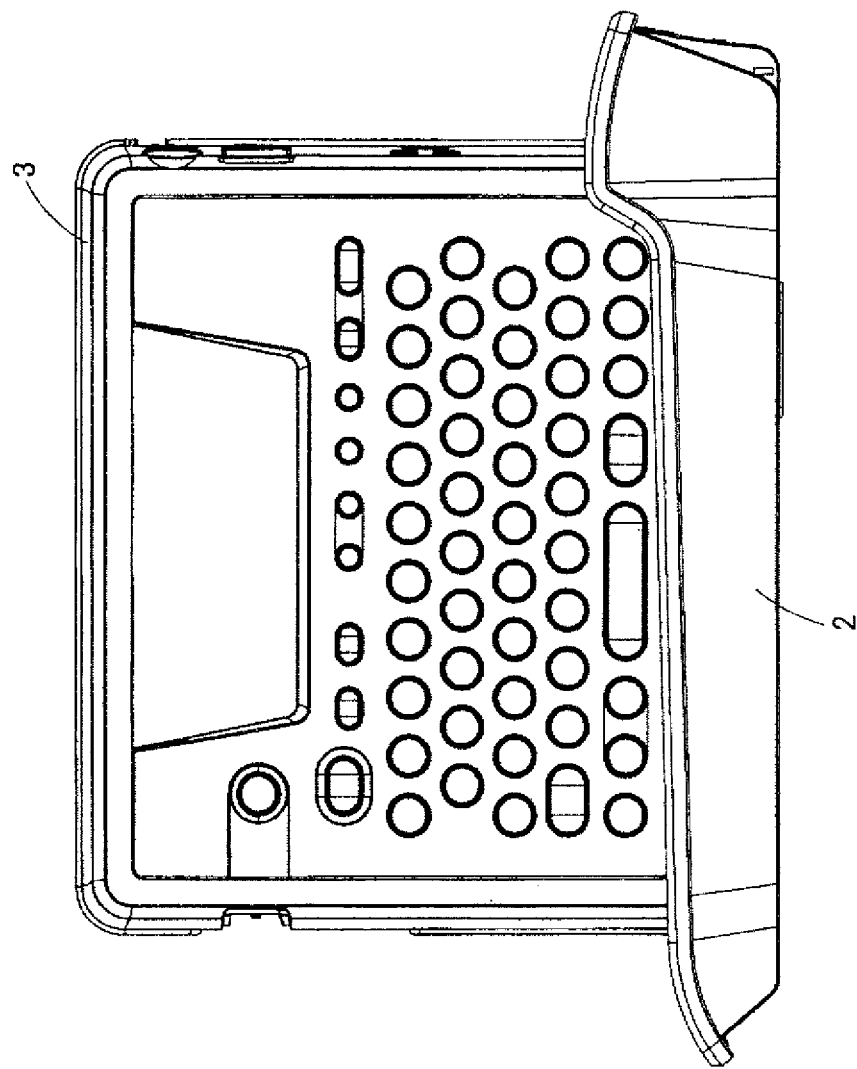
FIG. 1 is a view of an external appearance illustrating a state in which a printing apparatus is mounted on a power supplier.

As illustrated in FIG. 1, a printing apparatus 3 as one example of the electronic apparatus according to the present embodiment is mountable on a power supplier 2. When the printing apparatus 3 is mounted on the power supplier 2, electric power is supplied for electric charge from an external power source AC (see FIG. 6) as a commercial power source to a battery power source BT (see FIG. 6) provided in the printing apparatus 3.

External Structure of Printing Apparatus

Figure 2:
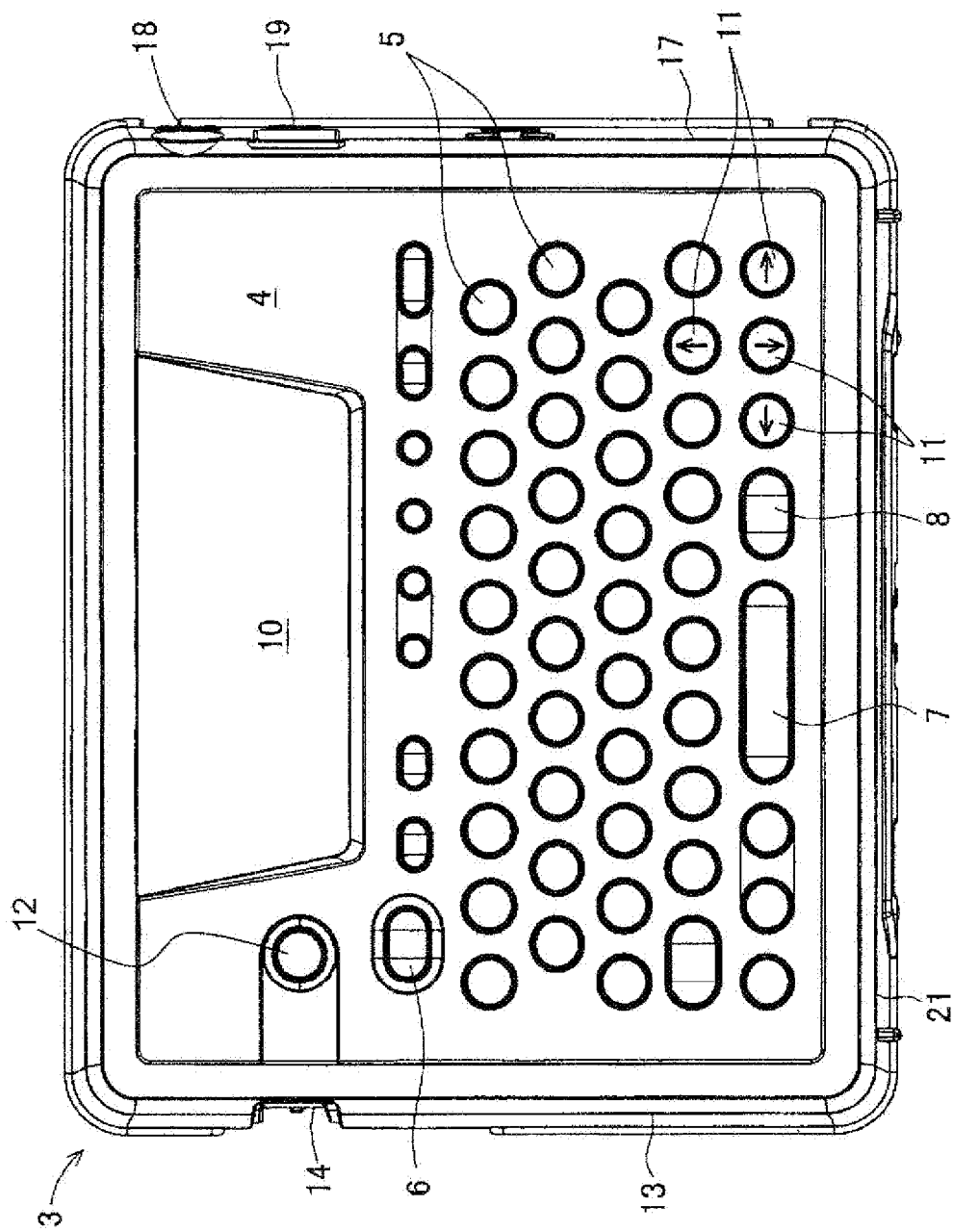
FIG. 2 is a front elevational view of the printing apparatus.
Figure 3:
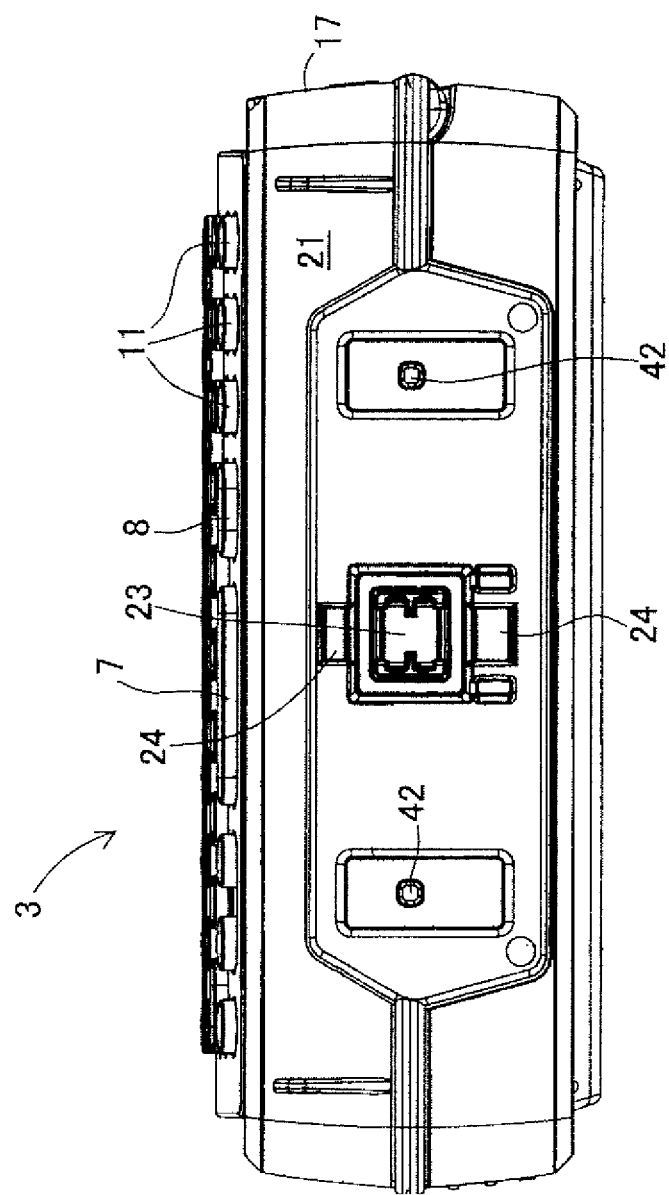
FIG. 3 is a bottom view of the printing apparatus.
Figure 4:
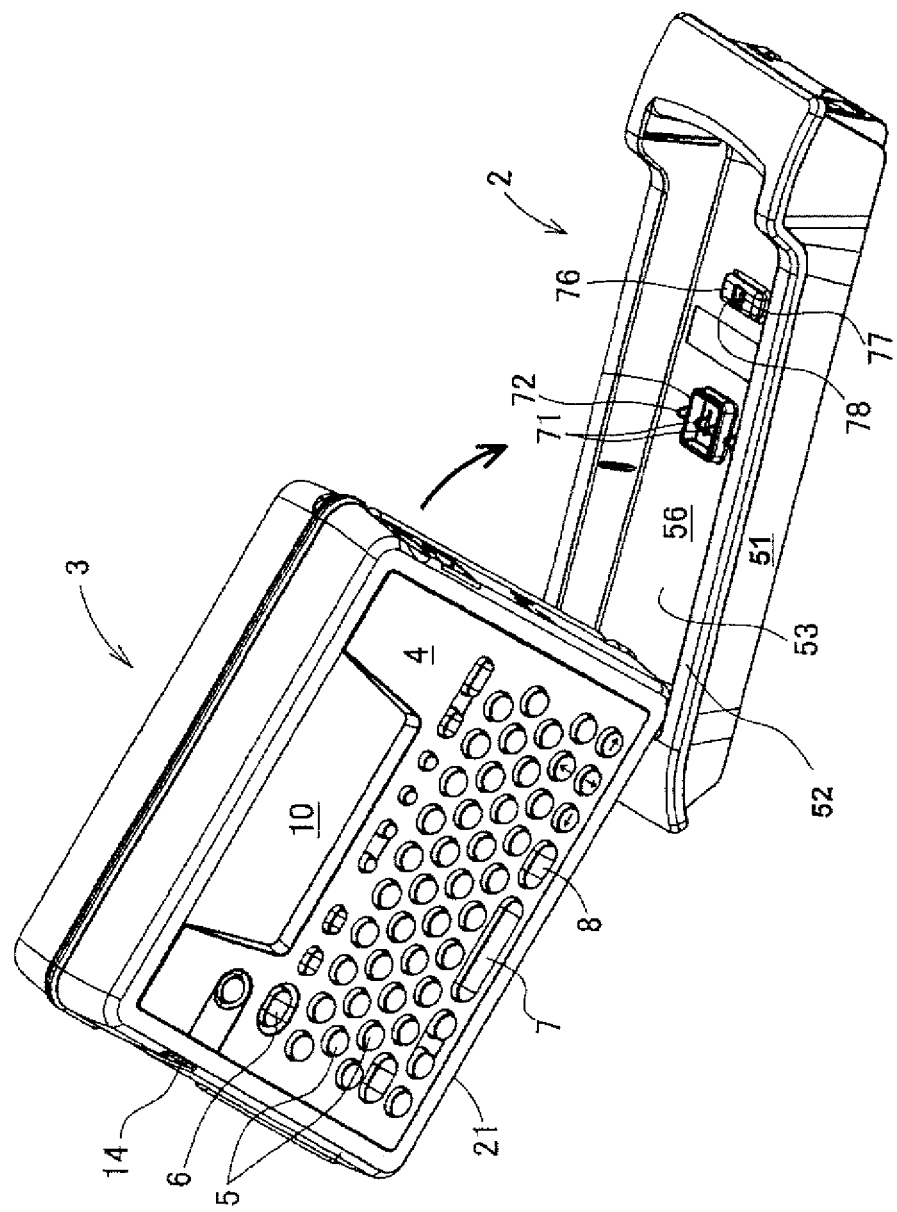
FIG. 4 is a perspective view illustrating mounting of the printing apparatus onto the power supplier.

The printing apparatus 3 is substantially shaped like a thin box. As illustrated in FIGS. 2 through 4, various function keys are arranged on an upper surface 4 of the printing apparatus 3 at a region located on an inner side of each end of the upper surface 4 by a predetermined distance (i.e., a region located outside the power supplier 2 in the case where the printing apparatus 3 is mounted on the power supplier 2 as illustrated in FIG. 1). The function keys include: character input keys 5 for creation of a text based on document data; a print key 6 for instructing printing; a space key 7 for input of a space; a return key 8 for instructing line feed and instructing execution and selection of various processings; a liquid crystal display 10 capable of displaying a plurality of lines of characters; cursor keys 11 for causing upward, downward, rightward, and leftward movement of a cursor displayed on the display 10; and a power switch 12. A left surface 13 of the printing apparatus 3 has a tape output opening 14 through which a printed tape is discharged. A right surface 17 of the printing apparatus 3 has an adapter-insertion opening 18 into which an output plug of a power-source adapter, not illustrated, is to be inserted. A connector 19 connectable to a USB cable for connection to a personal computer, not illustrated, is provided on the right surface 17 of the printing apparatus 3. The connector 19 corresponds to the USB Type-B, for example. Electric power is supplied from the external power source AC (see FIG. 6) to the printing apparatus 3 when the output plug of the power-source adapter is inserted into the adapter-insertion opening 18 in a state in which the upper surface 4 is horizontally placed on a tabletop. Alternatively, electric power is supplied from the battery power source BT (see FIG. 6) without insertion of the output plug of the above-described power-source adapter. The power supply enables the printing apparatus 3 to execute a print processing including printing on a tape.

A charge-power receiving terminal 23 and a pair of charge-power receiving terminals 24 are provided on a front surface 21 of the printing apparatus 3. The charge-power receiving terminal 23 is a negative terminal substantially shaped like a quadrangle in front view and is provided at a center of the printing apparatus 3 in its longitudinal direction (coinciding with the right and left direction in FIGS. 2 and 3) and at a center of the printing apparatus 3 in its thickness direction (coinciding with the up and down direction in FIG. 3). Each of the charge-power receiving terminals 24 is a positive terminal shaped like an oblong in front view. The charge-power receiving terminals 24 are provided outside the charge-power receiving terminal 23 in the thickness direction and symmetrically with respect to a center line of the printing apparatus 3 in the longitudinal direction. Each of the charge-power receiving terminals 23, 24 is one example of a power-source connector.

Though not illustrated, the printing apparatus 3 includes a battery accommodating portion capable of holding the chargeable battery power source BT (see FIG. 6) of any type. Examples of the battery power source BT include a lithium-ion battery power source and a nickel-hydrogen battery power source.

Configuration of Power Supplier

There will be next described an overall configuration of the power supplier 2 with reference to FIG. 4. As illustrated in FIG. 4, the power supplier 2 includes: a lower casing 51 substantially shaped like an oblong in plan view and opening in its upper surface; an upper casing 52 fitted on the upper surface of the lower casing 51 and including a mating portion 53 which is substantially shaped like an oblong in plan view and on which the printing apparatus 3 is mountable; and a power-supply circuit, not illustrated, disposed in a rear portion of the lower casing 51.

The printing apparatus 3 is inserted into the power supplier 2 in the front direction, so that the front surface 21 of the printing apparatus 3 is placed on a bottom surface 56 of the mating portion 53 of the power supplier 2. An outer circumferential portion of the printing apparatus 3 which is located below the space key 7, the return key 8, and the cursor keys 11; a lower portion of the right surface 17; and portions of the printing apparatus 3 which are respectively located near opposite end portions of the lower portion of the right surface 17 are supported by side and bottom walls and extending portions of the mating portion 53 of the power supplier 2 (see FIG. 1). The charge-power receiving terminals 23, 24 (see FIG. 3) provided on the front surface 21 of the printing apparatus 3 are brought into contact with the respective power-supply terminals 71, 72 protruding from the bottom surface 56 of the power supplier 2.

Bosses 42 (see FIG. 3) are provided upright on the front surface 21 of the printing apparatus 3. When a detection switch 77 is pressed by a back one of the bosses 42, the power-supply circuit is driven. That is, the back boss 42 inserted into a through hole 78 formed in a protrusion 76 provided on the bottom surface 56 of the power supplier 2, which turns the detection switch 77 on to drive the power-supply circuit. The battery power source BT held in the battery accommodating portion of the printing apparatus 3 is electrically charged via the power-supply terminals 71, 72, the charge-power receiving terminals 23, 24, and an electric-charge circuit 201 (see FIG. 6) to which the charge-power receiving terminals 23, 24 are connected. In this state, the printing apparatus 3 is connectable to a personal computer, or characters input with the character input keys 5 are printed on the tape that is conveyed frontward and discharged from the tape output opening 14.

Configuration of Cartridge

Figure 5:
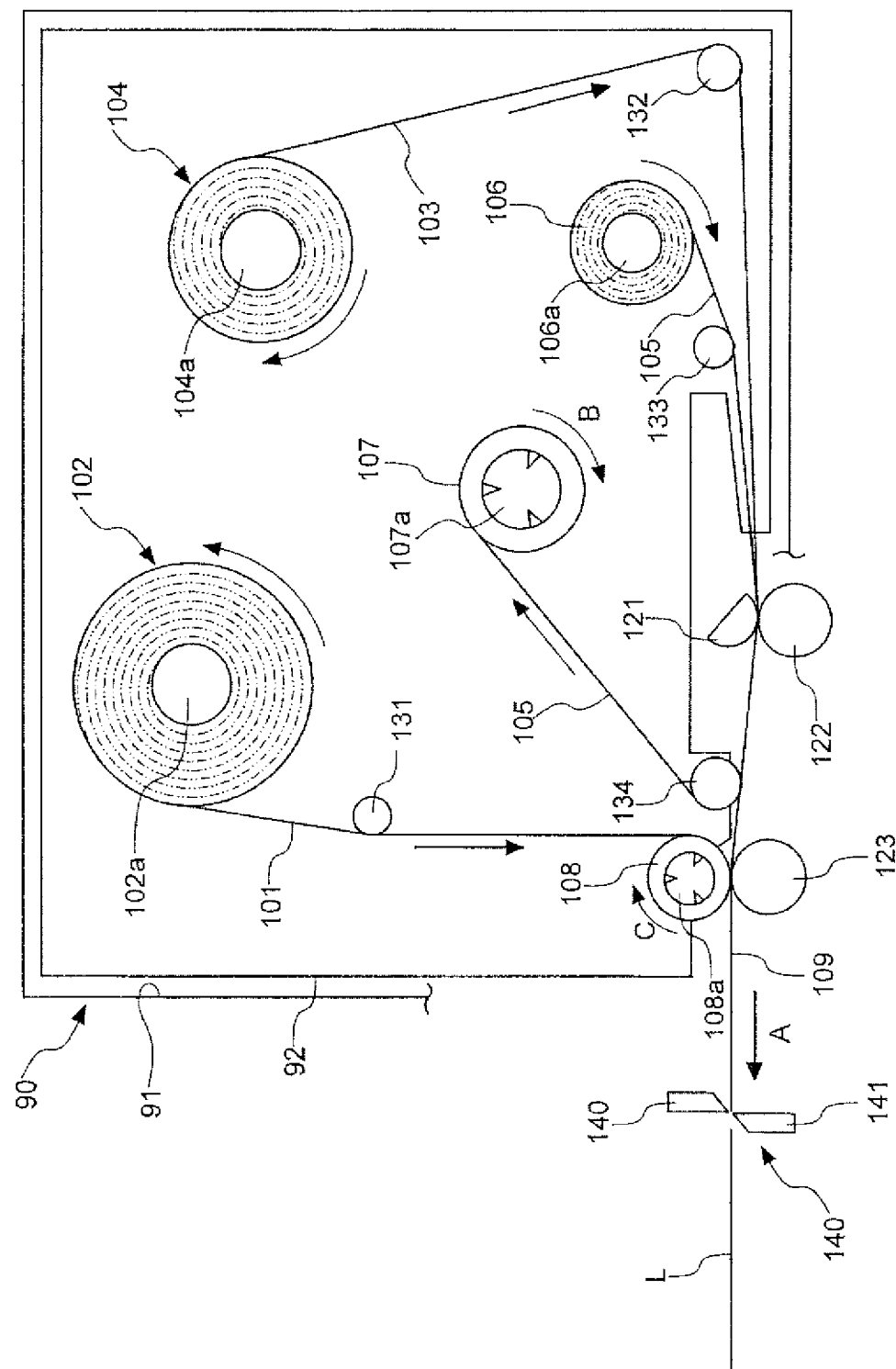
FIG. 5 is an enlarged plan view schematically illustrating an internal structure of a cartridge.

A cartridge holder 91 capable of holding a cartridge 90 is provided at a lower rear portion of the printing apparatus 3. The configuration of the cartridge 90 will be described in detail with reference to FIG. 5. As illustrated in FIG. 5, the cartridge 90 includes: a housing 92; a first roll 102 disposed in the housing 92 which is a roll of a strip-shaped substrate tape 101 and has a spiral shape (noted that FIG. 5 illustrates the first roll 102 in the form of concentric circles indicated by the two-dot chain lines for simplicity); a second roll 104 which is a roll of a transparent cover film 103, as one example of a printing medium, having substantially the same width as that of the substrate tape 101 and has a spiral shape (noted that FIG. 5 illustrates the second roll 104 in the form of concentric circles indicated by the two-dot chain lines for simplicity); a ribbon-supply-side roll 106 (in the form of concentric circles in FIG. 5 for simplicity) that is a roll of an ink ribbon 105 as a thermal transfer ribbon (noted that ribbon-supply-side roll 106 is not necessary in the case where a printing tape is a thermal tape); a ribbon-take-up roller 107 that takes up the ink ribbon 105 after printing; and a tape conveying roller 108 rotatably supported near a tape output portion of the cartridge 90.

The tape conveying roller 108 presses and sticks the substrate tape 101 and the cover film 103 against and to each other to form a printed-label tape 109 while conveying the printed-label tape 109 in the direction indicated by arrow A in FIG. 5.

The substrate tape 101 of the first roll 102 is wound around a reel member 102a. Though not illustrated in detail, the substrate tape 101 has four layers constituted by a first adhesive layer, a base film, a second adhesive layer, and a release paper sheet stacked on one another in this order in a direction directed from an inner side toward an outer side of the first roll 102, for example. The base film is a color film formed of polyethylene terephthalate (PET), for example.

The cover film 103 of the second roll 104 is wound around a reel member 104a. The desired-color ink ribbon 105 of the ribbon-supply-side roll 106 is wound around a reel member 106a. A thermal head 121 presses the ink ribbon 105 drawn from the ribbon-supply-side roll 106, against a back surface of the cover film 103 drawn from the second roll 104.

Corresponding to the configuration of the cartridge 90, a ribbon-take-up-roller drive shaft 107a and a tape-conveying-roller drive shaft 108a are provided on the cartridge holder 91. The ribbon-take-up-roller drive shaft 107a takes up the used ink ribbon 105. The tape-conveying-roller drive shaft 108a drives the tape conveying roller 108 as one example of a conveyor for conveying the printed-label tape 109. The thermal head 121 as one example of a printing device configured to perform printing on the cover film 103 is provided on the cartridge holder 91 so as to be located at an opening, not illustrated, when the cartridge 90 is mounted.

The ribbon-take-up roller 107 and the tape conveying roller 108 are rotated in conjunction with each other when a driving force generated by a drive motor 211 (see FIG. 6), e.g., a pulse motor, provided outside the cartridge 90 is transmitted to the ribbon-take-up-roller drive shaft 107a and the tape-conveying-roller drive shaft 108a via a gear mechanism, not illustrated.

While the conveying direction of each of the substrate tape 101, the cover film 103, and the ink ribbon 105 is defined by a corresponding one or two of guide reels 131, 132, 133, 134 arranged on the cartridge holder 91, positions and the number of the guide reels are not limited.

When the cartridge 90 is mounted on the cartridge holder 91, and thereby a roll holder is moved from a release position to a printing position, the cover film 103 and the ink ribbon 105 are nipped between the thermal head 121 and a platen roller 122 opposed to the thermal head 121. Also, the substrate tape 101 and the cover film 103 are nipped between the tape conveying roller 108 and a pressing-contact roller 123 opposed to the tape conveying roller 108. A driving force generated by the drive motor 211 rotates the ribbon-take-up roller 107 and the tape conveying roller 108 respectively in the directions indicated by the arrows B, C in FIG. 5. The tape-conveying-roller drive shaft 108a, the pressing-contact roller 123, and the platen roller 122 are coupled to each other by a gear mechanism, not illustrated. When the tape-conveying-roller drive shaft 108a is driven, the tape conveying roller 108, the pressing-contact roller 123, and the platen roller 122 are rotated, whereby the substrate tape 101 is drawn from the first roll 102 and supplied to the tape conveying roller 108.

The cover film 103 is drawn from the second roll 104, and a thermal-head control circuit 217 (see FIG. 6) energizes and heats a multiplicity of heating elements of the thermal head 121. In this operation, the ink ribbon 105 driven by the ribbon-take-up roller 107 is pressed by the thermal head 121 against the back surface of the cover film 103 (which is to be bonded to the substrate tape 101). As a result, desired characters are printed on the back surface of the cover film 103 based on print data. The substrate tape 101 and the printed cover film 103 are stuck together with the above-described first adhesive layer by pressing of the tape conveying roller 108 and the pressing-contact roller 123, thereby forming the printed-label tape 109 that is conveyed to the outside of the cartridge 90. The ink ribbon 105 having been used for printing on the cover film 103 is taken up by the ribbon-take-up roller 107 driven by the ribbon-take-up-roller drive shaft 107a.

A cutting mechanism (cutter) 140 is located downstream of a path for conveyance of the printed-label tape 109 discharged to the outside of the cartridge 90. The cutting mechanism 140 includes a fixed blade 141 and a movable blade 142. When a solenoid 222 (see FIG. 6) is energized by a solenoid driving circuit 221 (see FIG. 6), the movable blade 142 is operated to cut the printed-label tape 109 constituted by the cover film 103 and the substrate tape 101, thereby creating a printed label L.

Control System

Figure 6:
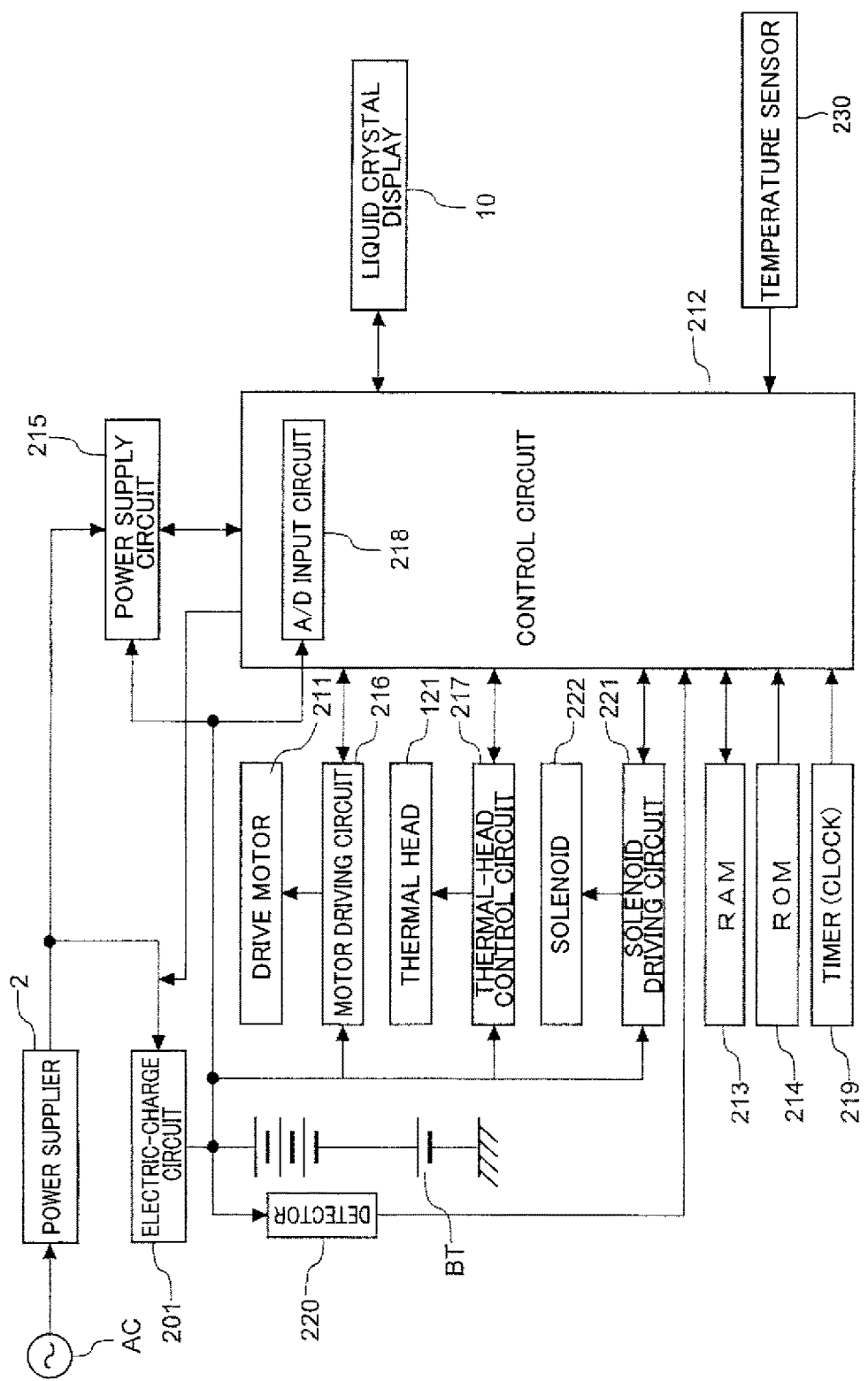
FIG. 6 is a functional block diagram of a control system of the printing apparatus.

There will be next described a control system of the printing apparatus 3 with reference to FIG. 6.

As illustrated in FIG. 6, the printing apparatus 3 includes a CPU 212 as one example of a controller configured to execute processings.

The CPU 212 controls the printing apparatus 3 by executing signal processings according to programs stored in a ROM 214 by using a temporary storage function of a RAM 213.

It is noted that the programs stored in the ROM may include application data and data relating to various condition values, which are used when the CPU 212 executes processings which will be described below. At least the various condition values are stored in another storage medium, not illustrated, configured such that data relating to stored values are not deleted even when the power switch 12 of the printing apparatus 3 is turned off, and the data relating to the stored values are updatable as needed, for example. It is noted that all the application data may be stored in this storage medium. In the present embodiment, data relating to various stored values are, for example, stored and updated in the above-described storage medium. Thus, in the following description, the wording "store" or "update" is used without describing and illustrating the storage medium unless otherwise specified. When the wording "update" is used in the following description, data relating to the stored values may be entirely or partly rewritten to new data and may be newly added unless otherwise specified. Alternatively, data may be temporarily stored into the RAM 213 as needed and updated in the storage medium when instructed.

Devices connected to the CPU 212 include: a power supply circuit 215 connected to the power supplier 2 via the charge-power receiving terminals 23, 24 and configured to turn the printing apparatus 3 on and off; the electric-charge circuit 201 (as one example of an electric charger) configured to execute a charge processing which will be described below; a motor driving circuit 216 configured to control the drive motor 211 that drives the platen roller 122; the thermal-head control circuit 217 configured to energize the heating elements of the thermal head 121; and the solenoid driving circuit 221 configured to control the solenoid 222 that drives the movable blade 142.

The CPU 212 includes an A/D input circuit 218 configured to detect an output voltage value of the battery power source BT. The battery power source BT is connected to the A/D input circuit 218.

The devices connected to the CPU 212 further include: the liquid crystal display 10; the RAM 213; the ROM 214; a timer 219 having a time-measurement function for measuring or obtain a present time; and a detector 220, such as an IC chip, for detecting a degree of degradation (degradation degree) of the battery power source BT. The detector 220 is one example of a degradation-degree detector. The ROM 214 stores a control program for execution of the charge processing for charging the battery power source BT and a label creating processing represented in, e.g., FIGS. 8 and 11. It is noted that the RAM 213 stores predetermined threshold values relating to the remaining amount value (%) of the battery power source BT, for example.

Here, the predetermined threshold values may be set stepwise with respect to the remaining amount value (%) of the battery power source BT, for example. The predetermined threshold values may be set in accordance with the functions of the printing apparatus 3. Examples of the predetermined threshold values include: a threshold value (E=100) in the case of a remaining amount value (100-98%) that enables determination that the battery power source BT is fully charged; a threshold value (E=80) in the case of a remaining amount value (80-97%) that enables determination that a print processing would not be terminated in the middle of it due to depletion of the battery power source BT unless a considerably large amount of printings are to be performed; a threshold value (E=60) in the case of a remaining amount value (60-79%) with a possibility of a shortage of the remaining amount of the battery power source BT in the middle of printing; a threshold value (E=40) in the case of a remaining amount value (40-59%) with a high possibility of a shortage of the remaining amount of the battery power source BT in the middle of printing; a threshold value (E=20) in the case of a remaining amount value (20-39%) with a considerably high possibility of a shortage of the remaining amount of the battery power source BT in the middle of printing; and a threshold value (E=19) in the case of a remaining amount value (less than 19%) that requires notification about the need of an electric charge. The number and percentages of the threshold values may be variable, in accordance with the width of a label and/or a relationship between a power consumption and the average number of labels created in one print processing in the past, using (i) a unit power consumption amount Es in creation of one printed label L and (ii) a cumulative power consumption amount Esum from the previous full charge, for example.

In the present embodiment, the battery power source BT is charged while correcting the contents of the charge processing in the process in which the battery power source BT is fully charged (noted that the process includes the start and middle of the charge), in accordance with the degradation degree of the battery power source BT by using desired charge parameters. There will be next described the charge processing in the present embodiment.

Details of Charge Processing

The printing apparatus 3 as one example of an electronic apparatus according to the present embodiment includes a plurality of operating devices including the thermal head 121, the drive motor 211, and the solenoid 222. As described above, the drive circuits (such as the thermal-head control circuit 217, the motor driving circuit 216, and the solenoid driving circuit 221) controls the operating devices to operate by electric power supplied from the battery power source BT contained in the battery accommodating portion. The battery power source BT contained in the battery accommodating portion is charged from the external power source AC (see FIG. 6) in the charge processing when the printing apparatus 3 is mounted on the mating portion 53, and thereby the battery power source BT is connected to the external power source AC (see FIG. 6) via the charge-power receiving terminals 23, 24 and the power supplier 2.

It is noted that the printing apparatus 3 is capable of executing the print processing by electric power supplied from the external power source AC in a state in which the output plug of the power-source adapter is inserted in the adapter-insertion opening 18 of the printing apparatus 3 placed on the tabletop, with the upper surface 4 facing upward. FIG. 6 however omits states of power supply to the drive circuits (including the thermal-head control circuit 217, the motor driving circuit 216, and the solenoid driving circuit 221). While FIG. 6 also omits states of power supply to operating devices, including the liquid crystal display 10, other than the drive circuits (including the thermal-head control circuit 217, the motor driving circuit 216, and the solenoid driving circuit 221), the power supply to the operating devices is performed in a well-known power-supply technique (including a switch between the external power source AC and the battery power source BT).

Thus, the printing apparatus 3 includes: the battery accommodating portion capable of holding the chargeable battery power source BT; the tape conveying roller 108 as one example of the conveyor that is driven by electric power supplied from the battery power source BT to convey the cover film 103 as one example of the printing medium; the thermal head 121 as one example of the printing device that is driven by electric power supplied from the battery power source BT to perform printing on the cover film 103 being conveyed; the charge-power receiving terminals 23, 24 each as the power-source connector for connection to the external power source AC; the electric-charge circuit 201 as one example of the electric charger performs an electric charge from the external power source AC to the battery power source BT when the charge-power receiving terminals 23, 24 are connected to the external power source AC; the detector 220 as one example of the degradation-degree detector that detects the degradation degree of the battery power source BT held by the battery accommodating portion; and the CPU 212 as one example of the controller.

A full-charge state of the battery power source BT is a state in which the battery power source BT is charged to the upper limit of its capacity. Repeating electric discharge and electric charge, an available capacity of the battery power source BT gradually decreases even if electric charge is completed when the power supplier 2, determines that the battery power source BT is fully charged. This decrease in capacity of the battery power source BT is called deterioration.

Figure 7:
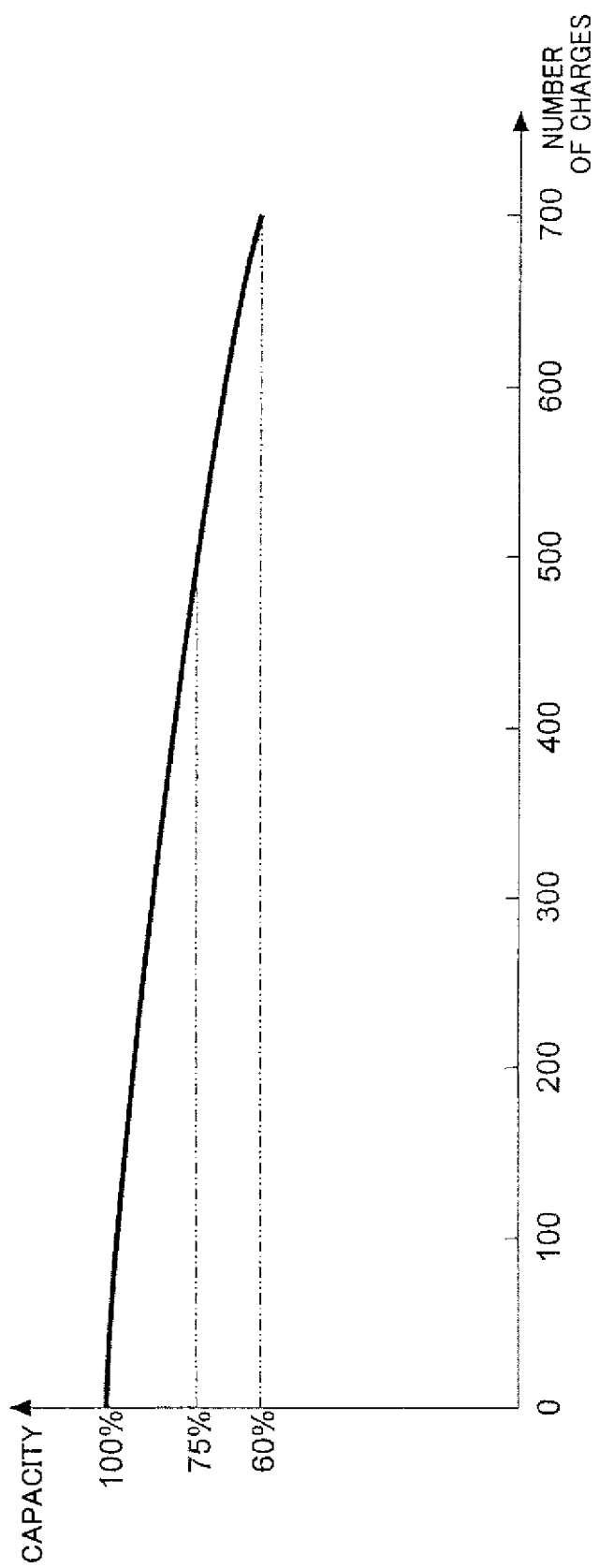
FIG. 7 is a graph representing a relationship between the number of electric charges and a degradation degree of a battery power source.

FIG. 7 illustrates one example of this deterioration. As illustrated in FIG. 7, in the case where it is assumed that the initial full-charge capacity is 1000 mAh, when electric charge and electric discharge are repeated 500 times, the full-charge capacity decreases to 75% (750 mAh), and when electric charge and electric discharge are repeated 700 times, the full-charge capacity decreases to 60% (600 mAh).

In the conventional charge processing using the above-described charge parameters, a fast charge processing (quick charge) is executed with a charging current value of 1000 mA. When the battery power source BT has become close to the fully charged state, and the voltage value of the battery power source BT has risen to 8.3 V, a slow charge processing is started instead of the fast charge processing, and the battery power source BT is slowly charged with a charging current value of 100 mA.

In the charge processing using the charge parameters in a fixed uniform pattern, however, an appropriate electric charge with consideration of, e.g., a habit unique to the battery power source BT and usage of the battery power source BT is not performed, so that the useful life of the battery power source BT unfortunately decreases with increase in the number of repetitions of electric charges and electric discharges.

In the present embodiment, charge parameters are set as follows:
Rechargeable Battery: 3.0-8.4 V (voltages that can be used for electric charge)
Slow-charge Current Value: 100 mA (variable in units of 10 mA)
Fast-charge Current Value: 1000 mA (variable in units of 10 mA)
Voltage Range in Fast Charge: 3.0-8.3 V (variable in units of −0.1 V)
Voltage Range in Slow Charge: 8.3-8.4 V (variable in units of +0.1 V)
Chargeable Temperature: −20-+48° C.
Degradation Degree: 0.00-100.00%
Average Degradation Degree: 0.05% (change by temperature in each charge)

There will be described one example of control executed by the CPU 212 for charging the battery power source BT using the charge parameters while correcting the contents of the full-charge processing in accordance with the degradation degree of the battery power source BT which is a result of detection of the detector 220.

Control Procedure in First Embodiment

There will be described a procedure of the charge processing for charging the battery power source which is executed by the CPU 212 with reference to FIG. 8.

This procedure begins with S11 at which the CPU 212 determines whether the printing apparatus 3 is mounted on the power supplier 2. This determination is executed based on states of energizing of the charge-power receiving terminals 23, 24, for example. That is, when the printing apparatus 3 is mounted on the power supplier 2 for charging by an operator (S11: Yes), this flow goes to S12. When the CPU 212 does not determine that the printing apparatus 3 is mounted on the power supplier 2, this flow goes to S32.

The CPU 212 at S12 calculates a present remaining amount value (%) of the battery power source BT and reads charge parameters that are some of the values stored in the above-described storage medium, and this flow goes to S13.

The CPU 212 at S13 sets a voltage value (or a current value) and a charge time for each of the fast charge and the slow charge for the remaining amount value E of the battery power source BT which is calculated using the charge parameters. The set voltage values (or current values) and the set charge time are stored into the RAM 213 in the form of a work table. Upon completion of the processing at S13, this flow goes to S14.

It is noted that, when the CPU 212 sets a voltage value (or a current value) and a charge time for each of the fast charge and the slow charge, in the case where the remaining amount value of the battery power source BT with a capacity of 2000 mAh is 15%, and an electric charge with a capacity of 1700 mAh is required, for example, the CPU 212 refers to the charge parameters and sets the voltage value (or the current value) and the charge time so as to first perform the fast charge at a charging current value of 1000 mA for one hour (1000 mA×1 h=1000 mAh) and thereafter perform the slow charge at a charging current value of 100 mA for seven hours (100 mA×7 h=700 mAh). It is noted that the above-described charge time can be monitored by a time of day or a taken time measured by the timer 219.

The CPU 212 at S14 controls the detector 220 to detect the degradation degree of the battery power source BT. The CPU 212 stores the detected degradation degree into, e.g., the RAM 213 or the above-described storage medium. Upon completion of the processing at S14, this flow goes to S15.

The CPU 212 at S15 controls the electric-charge circuit 201 to start an electric charge. In this charge, the fast charge is first performed with a charging current value of 1000 mA. Upon completion of the processing at S15, this flow goes to S16.

The CPU 212 at S16 determines whether the fast charge is finished. For example, the CPU 212 monitors whether the fast charge with a charging current value of 1000 mA has been performed, and when the CPU 212 determines that the fast charge with the charging current value of 1000 mA has been performed (S16: Yes), this flow goes to S17. When the CPU 212 determines that the fast charge with the charging current value of 1000 mA has not been performed (S16: No), this flow goes to S18. In this determination, the CPU 212 uses a voltage value to determine whether the electric charge reaches a target charge, for example. Thus, the charge parameters include a range of the voltage value in each of the fast charge and the slow charge which will be described below. This configuration enables the CPU 212 to determine whether the fast charge is performed and whether the slow charge is performed. Instead of using the voltage value to determine whether the fast charge is performed, the CPU 212 may determine whether the remaining amount value E of the battery power source BT which increases with the charge processing has reached a predetermined threshold value (e.g., E=80).

The CPU 212 at S18 determines whether a length of time measured by the timer 219 has reached a predetermined length of time (e.g., 30 seconds). This predetermined length of time is one example of a first particular interval. When the length of time measured by the timer 219 has reached 30 seconds as the predetermined length of time (S18: Yes), this flow goes to S19. When the length of time measured by the timer 219 has not reached 30 seconds as the predetermined length of time (S18: No), this flow returns to S15, and the fast charge is continued.

At S19, the CPU 212 controls the detector 220 to detect the degradation degree of the battery power source BT in the electric charge thereof. A temperature sensor 230 connected to the CPU 212 detects a detected temperature that is a temperature of the battery power source BT. The detected degradation degree and the detected temperature are associated with each other and as illustrated in FIG. 9 stored into, e.g., the RAM 213 or the above-described storage medium on a time-series basis, for example. FIG. 9 represents one example of the changes of the degradation degree and represents the temperature of the battery power source BT and changes of the degradation degree in a period just after the purchase of the printing apparatus 3 or just after replacement of the battery power source BT, i.e., in a state in which the battery power source BT is not deteriorated. In FIG. 9, the degradation degree deteriorates when the temperature of the battery power source BT is greater than or equal to 48° C. Upon completion of the processing at S19, this flow returns to S15, and the fast charge is continued.

At S17, the CPU 212 monitors whether the slow charge with a charging current value of 100 mA has been performed, for example. When the slow charge with the charging current value of 100 mA has been performed (S17: Yes), this flow goes to S20. When the slow charge with the charging current value of 100 mA has not been performed (S17: No), this flow goes to S18. Instead of using the voltage value to determine whether the slow charge is performed, the CPU 212 may determine whether the remaining amount value E of the battery power source BT which increases with the charge processing has reached a predetermined threshold value (e.g., E=100). In the processing at S17 just after the completion of the fast charge, the CPU 212 has not started the slow charge, and the fast charge is set. In the case where the flow has returned to S15 without satisfaction of the determination in the processing at S17, the CPU 212 switches the charge processing to be executed by the electric-charge circuit 201, from the fast charge to the slow charge. In the case of the slow charge, as in the case of the fast charge, the CPU 212 repeats the detection-timing determining processing at S18 and the degradation-degree detecting processing at S19 until the CPU 212 determines that the slow charge is finished.

At each of S16 and S17, the CPU 212 may execute the charge-completion determination by using the output voltage of the battery power source BT which is detected by the A/D input circuit 218 or using another well-known technique.

The CPU 212 at S20 controls the electric-charge circuit 201 to finish the fast charge and the slow charge, and this flow goes to S22. Thus, in a process from the charge starting processing at S16 to the charge terminating processing at S20, the CPU 212 uses the desired charge parameters (such as the voltage range, the current value, the temperature range, and the fully charged state) to control the electric-charge circuit 201 to execute the charge processing for charging the battery power source BT.

The CPU 212 at S22 refers to all the time-series results of the detections at S19 to execute an-average-increasing-rate-value calculating processing for calculating an average value of increasing rates of the degradation degree. The average value of increasing rates may be hereinafter referred to as "average-increasing-rate value". For example, it is assumed that the degradation degree is 0.05% at the start of the electric charge in the case where the electric charge is performed once in a state in which the printing apparatus 3 or the battery power source BT is new, but the degradation degree gradually deteriorates (in other words, the value of the degradation degree gradually increases) with increase in the temperature of the battery power source BT with the passage of time, and the degradation degree increases to 0.15% at the end of the electric charge. In this case, the increasing rate of the degradation degree is 0.10% in one electric charge. The CPU 212 stores the calculated average-increasing-rate value into the above-described storage medium, and this flow goes to S23.

In the case of the second or subsequent charge processings, for example, the storage medium stores the average-increasing-rate values in and before the preceding charge processing. Thus, the CPU 212 at S23 reads at least the preceding average-increasing-rate value (or a cumulative average-increasing-rate value which is an average of the previous ones of the average-increasing-rate values or all the average-increasing-rate values) and compares the average-increasing-rate value calculated at this time, with the read average-increasing-rate value in the same time series. Upon completion of the processing at S23, this flow goes to S24. In the case where there is no previous average-increasing-rate value, this flow goes to S24 without execution of comparison. Here, while the increasing rate of the degradation degree is 0.05% in one electric charge in the case where the battery power source BT is not deteriorated, the increasing rate of 0.10% in one electric charge at S22 is twice the increasing rate of 0.05%, which indicates that the charge processing has been executed on a bad condition (a bad charge pattern).

Based on a result of the comparison at S23 between the preceding average-increasing-rate value and the present increasing-rate value (the present increasing rate), the CPU 212 at S24 determines whether there is an increasing rate in the electric charge in which the increasing rate exceeds twice the preceding average-increasing-rate value as a first comparison value. That is, as in the case where the increasing rate of the degradation degree is 0.10%, in the case where the increasing rate is greater than or equal to twice the preceding average-increasing-rate value of 0.05% (S24: Yes), the CPU 212 executes a processing at S25 to correct the temperature range in the charge processing. Thus, the CPU 212 at S24 executes a first determining processing for determining whether the increasing rate exceeds twice the first comparison value, as a particular determination criterion relating to the degradation degree.

The CPU 212 normally determines that there is no problem, in the case where the temperature of the battery power source BT during electric charge is within a range higher than or equal to –20° C. and lower than or equal to 48° C., for example. In FIG. 9, when the temperature of the battery power source BT has reached 48° C., the degradation degree starts increasing. Thus, the CPU 212 at S25 excludes a temperature range higher than or equal to 48° C. and sets the temperature range to a range higher than or equal to –20° C. and lower than 48° C. That is, the CPU 212 corrects the temperature range to be used in the charge processing, so as to reduce the upper limit value of the temperature range. Upon completion of the processing at S25, this flow goes to S26. Thus, the CPU 212 at S25 executes a first correcting processing for correcting the contents of the charge processing.

The CPU 212 at S26 updates the corrected average-increasing-rate value by using the average-increasing-rate value of the temperature range other than the excluded temperatures, and this flow goes to S27.

When the CPU 212 at S24 determines that there is no increasing rate exceeding twice the first comparison value, based on the result of the comparison at S24 between the preceding average-increasing-rate value and the present increasing-rate value (the present increasing rate) (S24: No), the CPU 212 at S28 determines whether there is an increasing rate in the electric charge which exceeds 1.2 times the second comparison value. That is, when the increasing rate exceeds 1.2 times the preceding average-increasing-rate value though not exceeding twice the preceding average-increasing-rate value of 0.05% (S28: Yes), this flow goes to S29. When a negative decision is made at S28, this flow goes to S31. Thus, the CPU 212 at S28 executes a second determining processing for determining whether the increasing rate is greater than 1.2 times the second comparison value, as the particular determination criterion relating to the degradation degree.

The CPU 212 at S29 sets an upper-limit voltage as one of charge parameters for the fast charge, to 8.2 V by reducing 0.1 V, and sets a lower-limit voltage as one of charge parameters for the slow charge, to 8.4 V by adding 0.1 V, for example. That is, the CPU 212 corrects the voltage range used for the fast charge, so as to reduce the upper limit value of the voltage range, and corrects the voltage range used for the slow charge, so as to increase the lower limit value of the voltage range. Upon completion of the processing at S29, this flow goes to S30. It is noted that since the voltage range for the slow charge is originally set at a narrow range, the range is removed by increasing the lower limit value, and thereby the slow charge is to be performed using one voltage value. Accordingly, in the case where correction is made in the next or subsequent processing, the voltage is increased by 0.1 V. Thus, the CPU 212 at S29 executes a second correcting processing for correcting the contents of the charge processing.

The CPU 212 at S30 updates the corrected average-increasing-rate value by using the average-increasing-rate value without excluding the temperature range in the electric charge in which the average value is greater than 1.2 times the preceding average-increasing-rate value as the second comparison value. Upon completion of the processing at S30, this flow goes to S27.

The CPU 212 at S27 sets the charge parameters by using the average-increasing-rate value updated at S26 or S30 and stores the set charge parameters into the above-described storage medium, and this flow goes to S31.

The CPU 212 at S31 determines whether the printing apparatus 3 is separated from the power supplier 2, based on the states of energizing of the charge-power receiving terminals 23, 24 as in the processing at S15, for example. When the printing apparatus 3 is separated (removed) from the power supplier 2 by the operator in response to the battery power source BT being fully charged (S31: YES), this flow goes to S32.

The CPU 212 at S32 determines whether a label creating instruction is provided by operating the function keys. After the completion of the full charge, for example, when the operator has operated the function keys to input characters to be printed on the printed label L and provide the label creating instruction for creating the printed label L (S32: YES), this flow goes to S33.

The CPU 212 at S33 executes the label creating processing (see FIG. 11) to create the printed label L, and this flow returns to S11.

As described above, when the printing apparatus 3 is mounted on the power supplier 2, the CPU 212 detects the present remaining amount value (%) of the battery power source BT. The CPU 212 executes the charge processing (S16-S20) in which the CPU 212 controls the electric-charge circuit 201 by using the desired charge parameters (such as the voltage range, the current value, the temperature range, and the fully charged state) to charge the battery power source BT. The CPU 212 executes the degradation-degree-data storing processing (S19) for storing data on the degradation degree of the battery power source BT based on the result of detection of the detector 220. It is noted that this processing may be referred to as "degradation-degree monitoring" which is performed when the battery power source BT is being charged or not charged. The CPU 212 executes the determining processing (S24, S28) for determining whether the particular determination criterion relating to the degradation degree is satisfied. The CPU 212 executes the correcting processing (S25, S29) for correcting the contents of the charge processing in the determined time-varying changes in accordance with the result of determination in the determining processing (S24, S28) (as one example of a first charge mode).

It is noted that, in the case where the remaining amount value of the battery power source BT is lower than or equal to 80% when the printing apparatus 3 is mounted on the power supplier 2 at S11, the CPU 212 may at S13 make the charge setting such that the fast charge is performed until the remaining amount value reaches the threshold value (E=80) at S16, in other words, the remaining amount value is increased to 80%, and after the remaining amount value has reached the threshold value (E=80), the slow charge is performed until the battery power source BT is fully charged at S17. In this case, in the case where the remaining amount value of the battery power source BT is greater than or equal to 80% when the printing apparatus 3 is mounted on the power supplier 2 at S11, the CPU 212 at S13 makes the charge setting such that the slow charge is performed without the fast charge until the battery power source BT is fully charged.

Thus, the battery power source BT deteriorates each time when the electric charge and the subsequent electric discharge are repeated. In the present embodiment, the detector 220 for detecting the degradation degree of the battery power source BT is provided to delay the deterioration. The CPU 212 configured to control the electric-charge circuit 201 to execute the charge processing for charging the battery power source BT corrects the contents of the charge processing based on the result of detection of the detector 220.

That is, the data on the degradation degree is stored in the degradation-degree-data storing processing at S19 based on a plurality of results of detection of the detector 220 at particular intervals. In the determining processing at S24 or S28, the CPU 212 determines whether there is data satisfying the determination criterion in the stored data. In the correcting processing at S25 or S29, the CPU 212 corrects the contents of the charge processing based on the result of the determination.

With this configuration, in the case where the degradation degree is particularly deteriorated in a certain time period or temperature environment, for example, the CPU 212 does not execute the charge processing with the same contents but corrects the contents of the charge processing so as to delay the deterioration. This reduces the progress of the deterioration of the battery power source BT.

In the case where the CPU 212 executes the next or subsequent charge processing, when a positive decision (Yes) is made at S28, the CPU 212 at S30 cumulatively updates the average value using a series of the values of the degradation degree which are detected in the present processing, such that the average value can be read at S23 as the past average value. This reduces the progress of the deterioration of the battery power source BT.

When a positive decision (Yes) is made at S24, the CPU 212 determines that data in a temperature range in which the temperature of the battery power source BT is higher than or equal to 48° C. is malfunction data. The CPU 212 then excludes the temperature range and at S27 cumulatively updates the average value in a temperature range in which the temperature of the battery power source BT is lower than 48° C. This reduces the progress of the deterioration of the battery power source BT.

In the degradation-degree-data storing processing at S19, the CPU 212 stores the data on the degradation degree based on the results of detection of the detector 220 at the first particular interval (30 seconds in the above-described processing at S18) in the charge processing.

In the correcting processing at S25 or S29, the CPU 212 corrects at least one of the charge parameters permitted in the charge processing at S16-S20: the voltage range (3-8.3 V in the fast charge and 8.3-8.4 V in the slow charge); the current value (1000 mA in the fast charge and 100 mA in the slow charge); and the temperature range of the battery power source BT (−20-48° C.). The CPU 212 thereby prevents an electric charge in the next or subsequent charge processing which is performed in a pattern easily causing deterioration. This reduces progress of the deterioration of the battery power source BT.

The CPU 212 at S22 executes the-average-increasing-rate-value calculating processing for calculating the average value of the increasing rate of the degradation degree which is detected in a period from the start (S16) to the end (S20) of the charge processing. In the first determining processing at S24, the CPU 212 identifies the temperature range in which the value of the increasing rate in the present charge processing is greater than the average value of the increasing rate in the past charge processing (in other words, the increasing rate has deteriorated), as the determination criterion. In the first correcting processing at S25, the CPU 212 corrects the charge parameters in the identified temperature range. With this configuration, the CPU 212 identifies the temperature range in which the degradation degree has increased (deteriorated) more than the other temperature ranges in the charge processing, and corrects the charge parameter causing the deterioration, thereby preventing the deterioration in the next or subsequent charge processing.

In the first correcting processing at S25, the CPU 212 changes the permitted temperature range so as to exclude the temperature range of the battery power source BT (higher than or equal to 48° C. in the above-described example) in the increasing rate, of which ratio in the present charge processing to the average value is greater than or equal to the predetermined first value (e.g., twice the average value) in the identified temperature range (in other words, the ratio of the increasing rate in the present charge processing has sharply deteriorated).

One example of the cause of the sharp deterioration of the battery power source BT is a high-temperature environment. In the present embodiment, the CPU 212 identifies the temperature range in which the degradation degree has sharply deteriorated in the charge processing, and executes the charge processing in the next or subsequent charge processing by excluding the temperature range. This reliably reduces the progress of the deterioration of the battery power source BT.

In the case where the CPU 212 determines in the second determining processing at S28 that the ratio of the increasing rate in the present charge processing to the average value is less than the first value and greater than or equal to the second value (e.g., 1.2 times the average value) that is less than the first value, in the identified temperature range (in other words, the ratio of the increasing rate in the present charge processing has slightly deteriorated due to deterioration over time), the CPU 212 changes the permitted voltage range or current value in the second correcting processing at S29. Specifically, the CPU 212 changes the voltage ranges for the fast charge and the slow charge or reduces the fast-charge current value to switch the charge to the slow charge speedily.

Another cause of progress of the deterioration of the battery power source BT is settings of the voltage range and the current value in the charge processing though these settings less deteriorates the degradation degree than the high-temperature environment. In the present embodiment, in the case where the degradation degree has deteriorated in some degree in the charge processing, the charge processing in the next or subsequent charge processing is executed by changing the voltage range and the current value. This reduces the progress of the deterioration of the battery power source BT.

Figure 8:
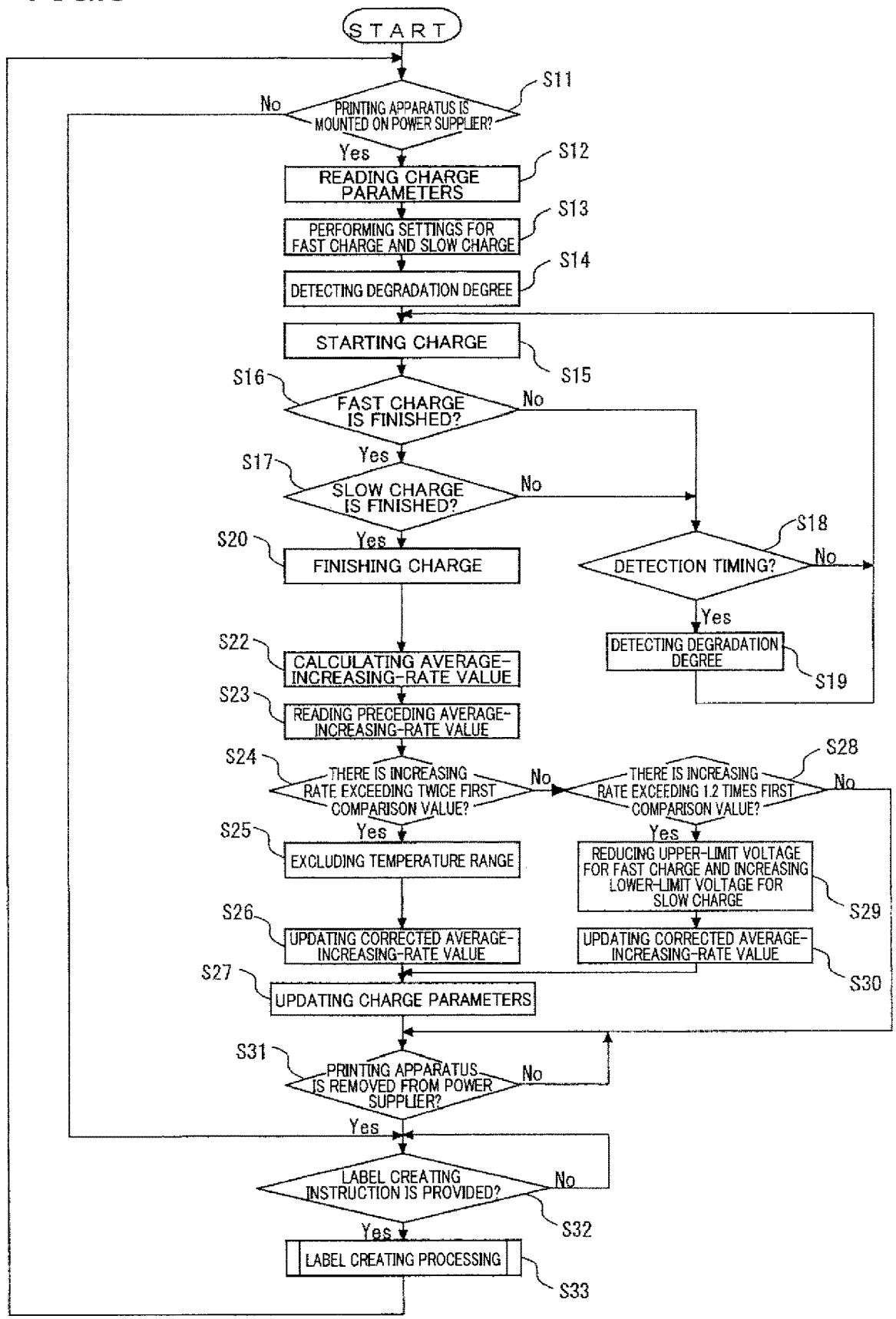
FIG. 8 is a flow chart representing a battery-power-source charging process executable by a CPU in a first embodiment.
Figure 10:
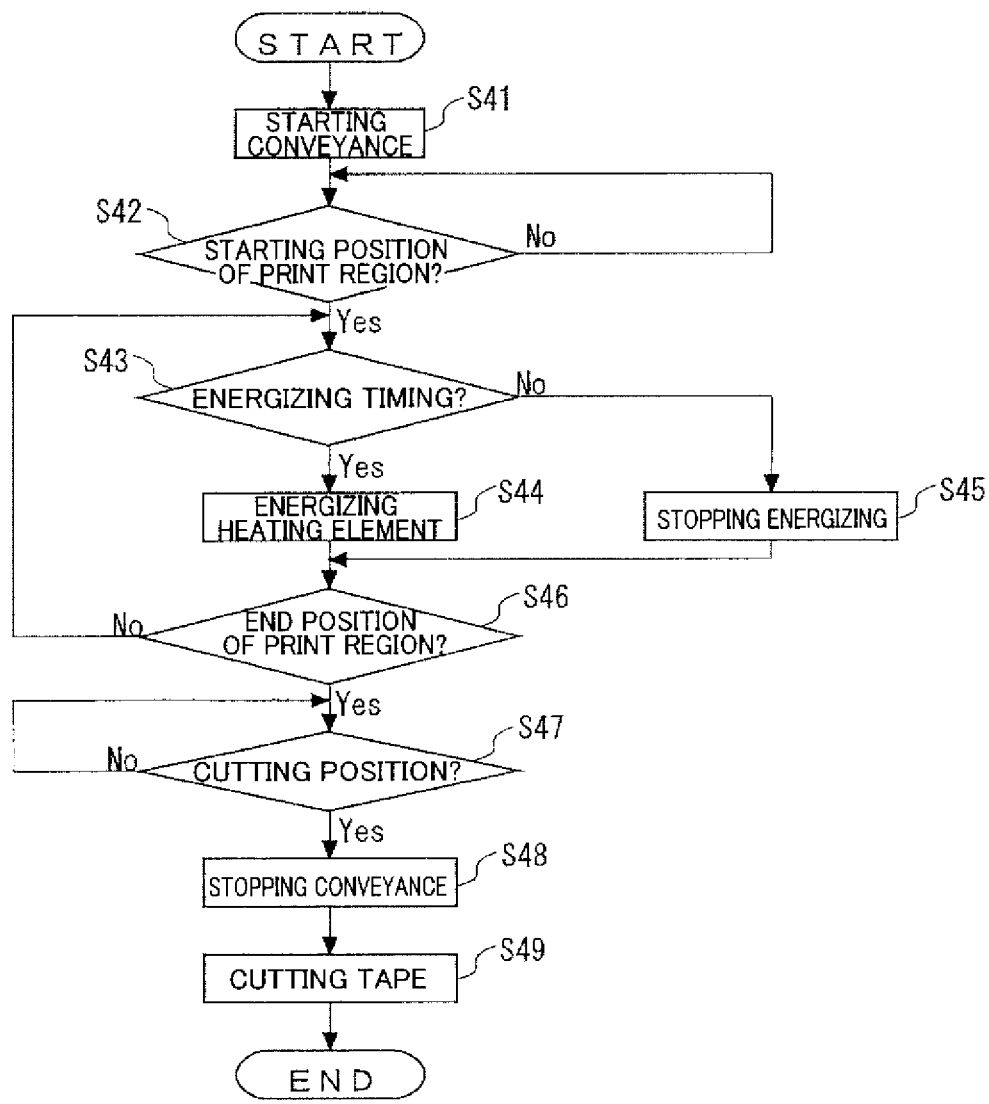
FIG. 10 is a flow chart representing a detailed procedure of a processing at S33 in FIG. 8.

There will be next described, with reference to FIG. 10, a detailed procedure of the label creating processing executed at S33 in FIG. 8.

The flow in FIG. 10 begins with S41 at which the CPU 212 outputs a control signal to the motor driving circuit 216 to drive the drive motor 211 to rotate the tape-conveying-roller drive shaft 108a and the ribbon-take-up-roller drive shaft 107a. This operation starts conveying the cover film 103, the substrate tape 101, and the printed-label tape 109.

The CPU 212 at S42 determines whether the conveyed cover film 103 has reached a starting position of a print region S. In other words, the CPU 212 determines whether the cover film 103 is conveyed to a position in the conveying direction at which the thermal head 121 is opposed to a front end of the print region S. This determination is executed in a well-known technique, for example, by counting the number of pulses of the drive motor 211 in the form of a stepping motor. When the cover film 103 is conveyed to the starting position of the print region S (S42: Yes), this flow goes to S43.

The CPU 212 at S43 determines whether the present timing is a timing when the heating elements of the thermal head 121 are to be energized, based on the print data created by input of the characters by the operator. The timing when the heating elements of the thermal head 121 are to be energized is a timing when the conveyed cover film 103 in the conveying direction is located at a position on the print region S where the characters are to be printed by the thermal head 121. The other timings are not the timing when the heating elements of the thermal head 121 are to be energized. When the present timing is the timing when the heating elements of the thermal head 121 are to be energized (S43: Yes), this flow goes to S44.

The CPU 212 at S44 outputs a control signal based on the print data to the thermal-head control circuit 217 to energize at least one of the heating elements of the thermal head 121 which is to be heated at the present timing. The energized heating elements transfer ink from the ink ribbon 105 to the cover film 103 to form the characters on the cover film 103.

The CPU 212 at S46 determines whether the conveyed cover film 103 has reached a printing end position of the print region S. In other words, the CPU 212 determines whether the cover film 103 is conveyed to a position in the conveying direction at which the thermal head 121 is opposed to a rear end of the print region S. This determination may be executed in a well-known technique as described above. When the cover film 103 is not conveyed to the printing end position of the print region S (S46: No), this flow returns to S43.

When the present timing is not the timing when the heating elements of the thermal head 121 are to be energized (S43: No), this flow goes to S45. The CPU 212 at S45 outputs a control signal to the thermal-head control circuit 217 to establish energizing-stopped states of all the heating elements of the thermal head 121, and this flow goes to S46.

Thus, while the thermal head 121 is opposed to the print region S, when the present timing is the energizing timing, the processings at S43, S44, S46, S43, and so on are executed in this order, and when the present timing is not the energizing timing, the processings at S43, S45, S46, S43, and so on are executed in this order.

When the thermal head 121 ceases to be opposed to the print region S (S46: Yes), this flow goes to S47.

The CPU 212 at S47 determines, based on the print data, whether the printed-label tape 109 is conveyed to a cutting position located downstream of the print region S. In other words, the CPU 212 determines whether the printed-label tape 109 is conveyed to the position in the conveying direction at which the movable blade 142 is opposed to the printed-label tape 109. This determination may be executed in a well-known technique as described above. When the printed-label tape 109 is conveyed to the cutting position (S47: Yes), this flow goes to S48.

The CPU 212 at S48 outputs a control signal to the motor driving circuit 216 to control the drive motor 211 to stop rotating the tape-conveying-roller drive shaft 108a and the ribbon-take-up-roller drive shaft 107a. This operation stops conveying the cover film 103, the substrate tape 101, and the printed-label tape 109.

The CPU 212 at S49 outputs a control signal to the solenoid driving circuit 221. In response, the solenoid 222 is driven to cut the printed-label tape 109 to create the printed label L, and this flow ends.

Control Procedure in Modification of First Embodiment

Figure 11:
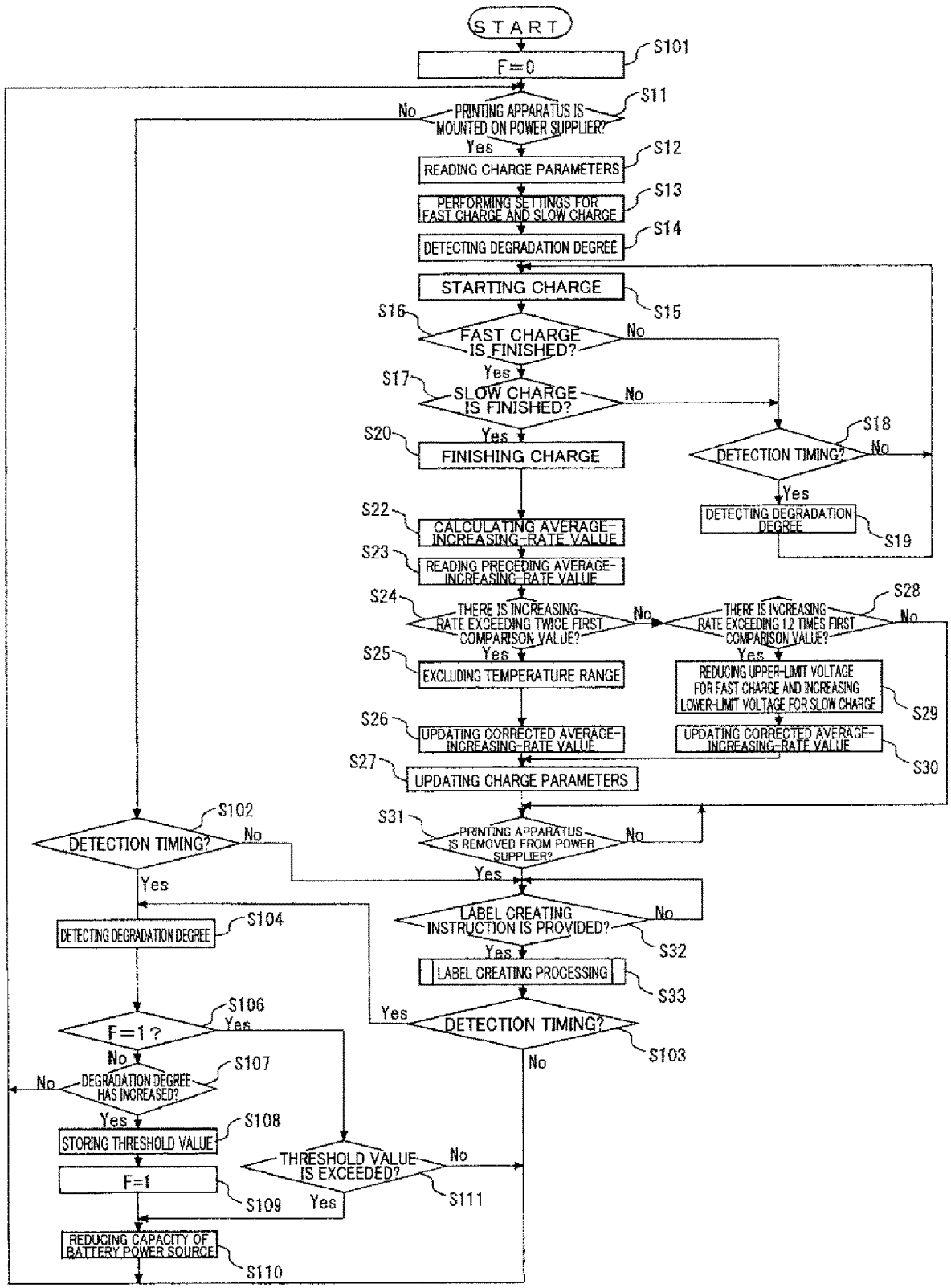
FIG. 11 is a flow chart representing a battery-power-source charging process executable by the CPU in a modification of the first embodiment.

There will be next described a modification of the first embodiment with reference to FIG. 11. In addition to the charge processing in the first embodiment, in this modification, monitoring is also performed in a period in which the electric charge is not performed. Thus, all the processings in FIG. 8 are executed also in this modification.

In addition, in this modification, before the processing at S11, the CPU 212 at S101 sets a threshold-value flag, which will be described below, to "0", in other words, the CPU 212 clears the flag, and this flow goes to S11.

The CPU 212 at S11 determines whether the printing apparatus 3 is mounted on the power supplier 2. When the positive decision (Yes) is made at S11, the CPU 212 executes the processings S12-S33. In this modification, when the printing apparatus 3 is not mounted on the power supplier 2 (S11: No), the flow goes to S102.

The CPU 212 at S102 determines whether a length of time measured by the timer 219 has reached a predetermined length of time (e.g., one hour) as one example a second particular interval in the state in which the printing apparatus 3 is not mounted on the power supplier 2. The CPU 212 at S103 determines whether a length of time measured by the timer 219 has reached the predetermined length of time (e.g., one hour) in a state in which the label creating processing is finished (noted that this state may include a period in which the processing at S33, i.e., the label creating processing, is being executed). When the predetermined length of time has elapsed (S102, S103: Yes), this flow goes to S104. When the CPU 212 at S102 determines that the predetermined length of time has not elapsed (S102: No), this flow goes to S32. When the CPU 212 at S103 determines that the predetermined length of time has not elapsed (S103: No), this flow returns to S11.

At S104, as in the processing at S14, the CPU 212 controls the detector 220 to detect the degradation degree of the battery power source BT in the electric charge thereof. The detected degradation degree is stored into, e.g., the RAM 213 or the above-described storage medium, as one of the degradation degrees in time series, independently of the processings at S14 and S19, and this flow goes to S106.

Incidentally, monitoring is also performed in the period in which the electric charge is not performed, as described above. The degradation degree of the battery power source BT is detected at intervals of the predetermined length of time (e.g., one hour) in the period in which the electric charge is not performed, i.e., the state in which the printing apparatus 3 is not mounted on the power supplier 2 (S11: No) or the state in which the printing apparatus 3 is removed from the power supplier 2, and the label creating processing is being executed or finished (S33).

Here, this modification is different from the first embodiment in that the degradation degree increases even though the electric charge is not being performed. This means that the printing apparatus 3 is used or stored in a bad environment for the battery power source BT.

It is assumed that such a bad environment would not be improved in the future. That is, the back environment is not improved by adjusting the value of a particular parameter.

To reduce deterioration of the battery power source BT in the electric charge under the bad environment, when the printing apparatus 3 has detected that the printing apparatus 3 is used under the bad environment, the next or subsequent charge processing is preferably executed so as to avoid a full charge.

Thus, the CPU 212 at S106 determines whether the threshold-value flag is set to "1", in other words, the CPU 212 sets the flag. When the flag is "0" (S106: No), this flow goes to S107. When the flag is "1" (S106: Yes), this flow goes to S111.

The CPU 212 at S107 determines whether the degradation degree has increased. That is, when the present value of the degradation degree is greater than the preceding value of the degradation degree in the processing at S107 (S107: Yes), this flow goes to S108. When the present value of the degradation degree is not greater than the preceding value of the degradation degree (S107: No), this flow returns to S11.

The CPU 212 at S108 stores various conditions in the increase in the degradation degree, into the storage medium as a threshold value. Examples of the conditions include a temperature history and an elapsed time for each temperature. In one example of the conditions, the printing apparatus 3 is stored for five hours at 50° C. Upon completion of the processing at S108, this flow goes to S109.

When the printing apparatus 3 is used under the bad environment to execute the next or subsequent charge processing, the charged capacity needs to be reduced. Thus, the CPU 212 at S109 sets the flag to "1", and this flow goes to S110. This flag is a flag for causing the CPU 212 to recognize that the printing apparatus 3 is used under the bad environment.

The CPU 212 at S110 executes a correcting processing for lowering a threshold value (E=100) at which the CPU 212 recognizes that the battery power source BT is fully charged. In other words, the CPU 212 reduces the capacity of the battery power source BT by 5%, for example. The CPU 212 updates the threshold value E for determination of the full charge, and this flow returns to S11.

Since the flag is "1" in the second or subsequent determination at S106, this flow goes to S111 at which the CPU 212 determines whether the threshold value is exceeded. When the CPU 212 determines that the threshold value (for example, the printing apparatus 3 is stored for five hours at 50° C.) stored at S108 for the various conditions in the increase in the degradation degree is exceeded or satisfied (S111: Yes), this flow goes to S110 at which the CPU 212 further reduces, by 5%, the capacity at which the CPU 212 determines that the battery power source BT is fully charged.

When the threshold value for the various conditions in the increase in the degradation degree is not exceeded (S111: No), this flow returns to S11.

In the modification of the first embodiment, as described above, the CPU 212 in the degradation-degree-data storing processing at S104 determines the time-varying changes of the degradation degree based on the results of detection of the detector 220 at intervals of the second particular interval (e.g., one hour) in the state in which the charge processing is not executed. In the correcting processing at S110, the CPU 212 changes the contents of the charge processing to change the charged capacity of the battery power source BT to a capacity (−5%) that is less than the charged capacity to which the battery power source BT is fully charged in the preceding electric charge.

The battery power source BT in some cases deteriorates when the electric charge is not performed. Thus, the CPU 212 is demanded to store data on the degradation degree when the charge processing is not executed. Based on these data, the CPU 212 changes a target state established by the charge processing not to the normal fully charged state but to a state in which the charged capacity is less than that in the normal fully charged state. With this configuration, even in the case where the user uses or stores the battery power source BT in a situation in which deterioration easily occurs, the fully charged state is avoided. This reduces progress of the deterioration of the battery power source BT.

Control Procedure in Second Embodiment

In the conventional technique as described above, whatever time the user has mounted the printing apparatus 3 on the power supplier 2, the fast charge is performed to 8.3 V fixedly, and thereafter the slow charge is performed to 8.4 V. Thus, in the case where the printing apparatus 3 is mounted on the power supplier 2 at 10 p.m., for example, the fast charge and the slow charge are performed. In the case where the required time is two hours, the electric charge is completed at 0 a.m.

However, in the case where there is a history in which the user removes the printing apparatus 3 from the power supplier 2 as illustrated in FIG. 12, for example, this user does not remove the printing apparatus 3 from the power supplier 2 in late night (0 a.m.-5 a.m.). In other words, even in the case where the battery power source BT is fully charged at 0 a.m. as described above, the user rarely uses the printing apparatus 3 thereafter, so that the time is meaningless.

No problems arise if the battery power source BT is fully charged by 6 a.m. at the latest according to the usage history. Thus, in the case where the electric charge is performed such that the full charge of the battery power source BT is completed not at 0 a.m. but at 6 a.m., it is possible to reduce a load imposed on the battery power source BT due to the fast charge. In this case, if only the slow charge is performed for reduced load, there is a possibility that the battery power source BT is not fully charged at 6 a.m. Also, the user may unexpectedly use the printing apparatus 3 in the middle of the electric charge.

In view of the above, in the case where the electric charge is performed in a period in which the printing apparatus 3 is not used according to the history, e.g., in late night, the fast charge with the charging current value of 1000 mA and the slow charge with the charging current value of 100 mA are not performed preferably. Instead, a middle-speed charge is preferably executed in the charge processing so as to reduce deterioration of the battery power source BT. The charge speed of the middle-speed charge is variable and between the charge speed of the fast charge and the charge speed of the slow charge.

Figure 13:
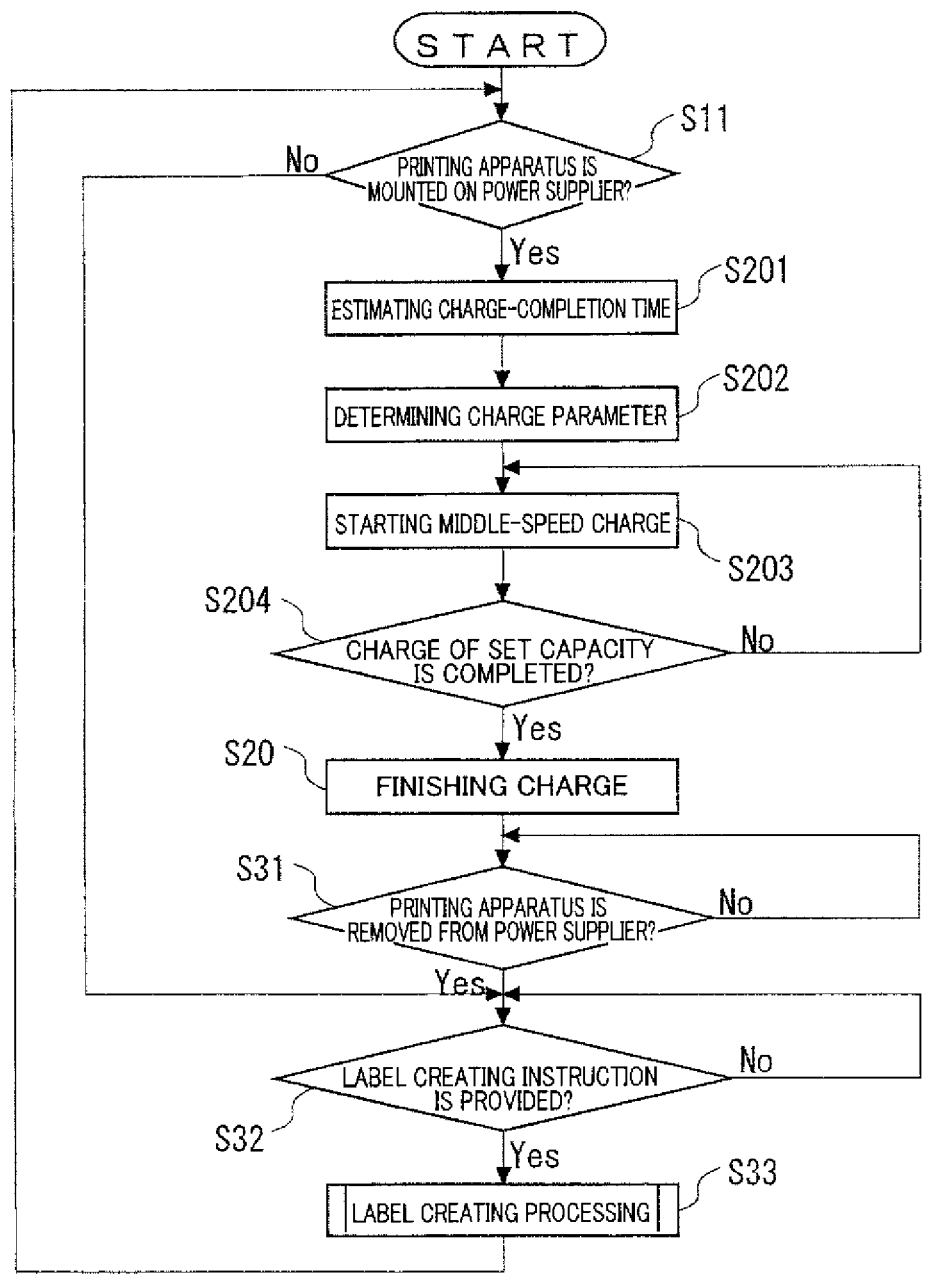
FIG. 13 is a flow chart representing a battery-power-source charging process executable by the CPU in a second embodiment.

FIG. 13 represents one example of the charge processing with the middle-speed charge. In the following description, when the printing apparatus 3 is removed from the power supplier 2, the CPU 212 determines that the printing apparatus 3 is to be used and creates the usage history as illustrated in FIG. 12. However, a history of execution of the processing at S33 may be used as a usage history, and both of the usage history and a charge history may be used, for example. It is noted that the same step numerals as used in FIG. 8 are used to designate the corresponding processings in FIG. 13, and an explanation of which is dispensed with.

When the printing apparatus 3 is mounted on the power supplier 2 at S11, the CPU 212 at S201 refers to the present time of the timer 219 and the past usage history stored in the storage medium to estimate a charge-completion time. The charge-completion time is approximated at a chargeable time (i.e., a required time). For example, in the case where the printing apparatus 3 is mounted at 11 p.m. when there is a low possibility of use of the printing apparatus 3, the charge-completion time is approximated at seven hours (11 p.m.-6 a.m.). In the case where the printing apparatus 3 is mounted on the power supplier 2 in a time period in which there is a high possibility of use of the printing apparatus 3 according to the past history, the CPU 212 may not execute this procedure and execute the procedure in FIG. 8 or 11. Upon completion of the processing at S201, this flow goes to S202.

The CPU 212 at S202 determines the charge parameters based on the remaining capacity of the battery power source BT and the chargeable time calculated at S201. For example, in the case where a charge capacity required for the full charge is 1400 mAh, and the middle-speed charge with a fixed charging current value is performed (or the middle-speed charge and the slow charge are performed in accordance with the approximated time), the charge parameter is 200 mA (1400 mA/7) since the required time is seven hours. Upon completion of the processing at S202, this flow goes to S203. In the case where the battery power source BT is consumed only by an amount corresponding to two to three hours of the middle-speed charge, the printing apparatus 3 may perform the middle-speed charge for one hour and the slow charge for six hours, for example.

The CPU 212 at S203 controls the electric-charge circuit 201 to start an electric charge with the charge amount set at S202, and this flow goes to S204.

The CPU 212 at S204 monitors and determines whether the middle-speed charge with the charge parameter set at S202 has been performed for seven hours (or the middle-speed charge and the slow charge have been performed for the total of seven hours), for example. When the middle-speed charge has been performed for seven hours (or the middle-speed charge and the slow charge have been performed for the total of seven hours) (S204: Yes), this flow goes to S20. When the middle-speed charge has not been performed for seven hours (or the middle-speed charge and the slow charge have not been performed for the total of seven hours) (S204: No), this flow returns to S203, and these processings are repeated until the charge-completion determination is made (S204: Yes). It is noted that, since the charge time is a guide as described above, the charge-completion determination is finally determined using the voltage value preferably as in the above-described embodiment.

In the case where the printing apparatus 3 executes the middle-speed charge by referring to the remaining amount value of the battery power source BT, the present time, and the past usage history, the CPU 212 uses the charge parameter (e.g., a middle-speed-charge current value and a middle-speed-charge voltage range) corrected in accordance with the required time, to execute the charge processing by using the middle-speed charge (as one example of a second charge mode) or both the middle-speed charge and the slow charge.

Thus, the printing apparatus 3 has: the first charge mode (a degradation-degree monitoring mode) in which the CPU 212 executes the degradation-degree-data storing processing at S19, the determining processing at S24 or S28, and the correcting processing at S25 or S29; and the second charge mode (a long-rechargeable-battery-life mode) in which the CPU 212 adjusts a manner of a new charge processing based on the execution history of the past charge processing without executing the degradation-degree-data storing processing at S19, the determining processing at S24 or S28, and the correcting processing at S25 or S29.

In the case where the user uses the printing apparatus 3, as described above, a fixed charge pattern is applied in some cases depending upon the usage environment of the printing apparatus 3 and/or operations of the user, for example. In the present embodiment, however, the second charge mode is provided, and the CPU 212 adjusts the manner of a new charge processing based on the execution history of the past charge processing.

With this configuration, in the case where it is clear that the user does not interrupt the charge processing in a specific period such as late night, for example, the CPU 212 executes the charge processing slowly for a relatively long time until the late night ends. This enables the electric charge to be performed with reduced deterioration when compared with a case where the fast charge processing is normally executed just after the start of the charge processing, for example. This reduces the progress of the deterioration of the battery power source BT.

In the first charge mode, the charge processing includes: the fast charge processing in which the battery power source BT is charged speedily at a relatively large current value; and the slow charge processing in which the battery power source BT is charged slowly at a relatively small current value. In the second charge mode, the CPU 212 executes the medium-speed charge processing that is slower than the fast charge processing and faster than the slow charge processing, as the charge processing, using a current value that is less than the current value in the fast charge processing and greater than the current value in the slow charge processing, in a period extending from the start of a new charge processing to the end of the new charge processing which is estimated by the execution history (e.g., seven hours from 11 p.m. to 6 a.m.).

Since the CPU 212 executes the medium-speed charge processing slower than the normal fast charge processing as described above, it is possible to reliably reduce the progress of the deterioration of the battery power source BT.

Control Procedure in Modification of Second Embodiment

Figure 14:
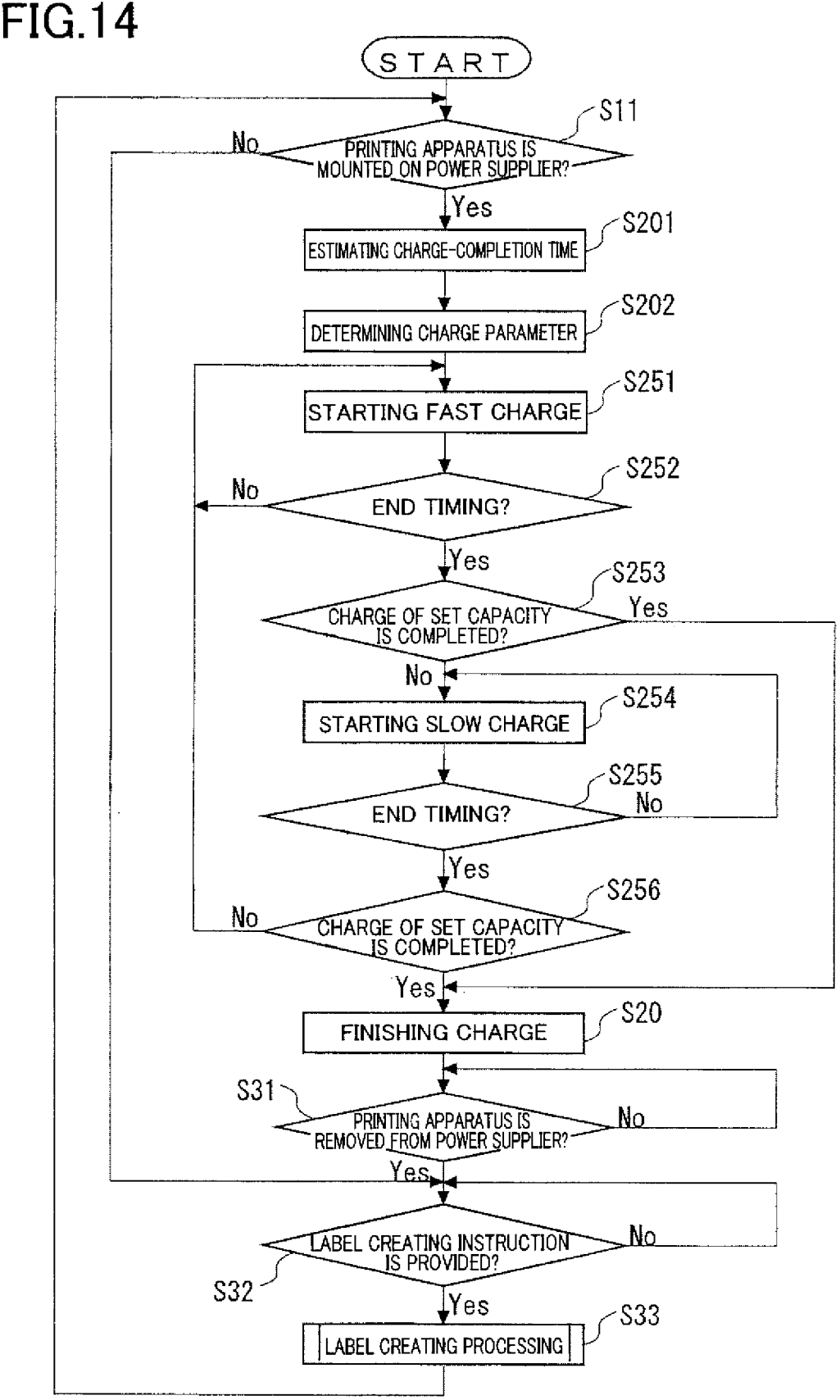
FIG. 14 is a flow chart representing a battery-power-source charging process executable by the CPU in a modification of a second embodiment.

There will be next described a modification of the second embodiment with reference to FIG. 14. In this modification, the fast charge and the slow charge are repeated instead of the medium-speed charge processing in the second embodiment. It is noted that the same step numerals as used in FIG. 8 or 13 are used to designate the corresponding processings in FIG. 14, and an explanation of which is dispensed with.

In the case where the remaining amount value of the battery power source BT with a capacity of 2000 mAh is 30%, and an electric charge with a capacity of 1700 mAh is required, for example, the printing apparatus 3 may be set so as to first perform the fast charge at a charging current value of 1000 mA for one hour (1000 mA×1 h=1000 mAh) and thereafter perform the slow charge at a charging current value of 100 mA for seven hours (100 mA×7 h=700 mAh). In this processing, a plurality of the fast charges and a plurality of the slow charges may be performed. In the above-described case, for example, the printing apparatus 3 may perform: the fast charge with the charging current value of 1000 mA for 30 minutes (0.5 h); then the slow charge with the charging current value of 100 mA for 3 hours and 30 minutes (3.5 h); then the fast charge with the charging current value of 1000 mA for 30 minutes (0.5 h) again; and then the slow charge with the charging current value of 100 mA for 3 hours and 30 minutes (3.5 h). Thus, the charge processing may be divided into a plurality of sets of processings such that each set corresponds to a half of the charge processing, one-third of the charge processing, one-fourth of the charge processing, or so on.

In the flow in FIG. 14, when the printing apparatus 3 is mounted on the power supplier 2 at S11, and the charge-completion time is estimated (the required time is calculated) at S201, the CPU 212 at S202 executes a fast-and-slow-charge adjustment processing for determining the charge parameters for the fast charge and the slow charge based on the remaining capacity of the battery power source BT and the chargeable time calculated at S201, and this flow goes to S251. The following description will be given, assuming that the printing apparatus 3 performs two sets of the fast charge with the charging current value of 1000 mA for 30 minutes (0.5 h) and the slow charge with the charging current value of 100 mA for 3 hours and 30 minutes (3.5 h).

The CPU 212 at S251 controls the electric-charge circuit 201 to start the fast charge of the charge amount set at S202, and this flow goes to S252.

The CPU 212 at S252 determines whether the present timing is the end timing of the first fast charge using the charge parameter determined at S202, based on time measuring of the timer 219 or the remaining amount value of the battery power source BT. When the CPU 212 determines that the present timing is the end timing of the first fast charge (S252: Yes), this flow goes to S253. When the CPU 212 determines that the present timing is not the end timing of the first fast charge (S252: No), this flow returns to S251.

The CPU 212 at S253 determines whether all the sets of the fast charges which correspond to the charge parameter determined at S202 are completed. Since only the first fast charge is finished in this case (S253: No), this flow goes to S254.

The CPU 212 at S254 controls the electric-charge circuit 201 to start the slow charge of the charge amount set at S202, and this flow goes to S255.

The CPU 212 at S255 determines whether the present timing is the end timing of the first slow charge using the charge parameter determined at S202, based on time measuring of the timer 219 or the remaining amount value of the battery power source BT. When the CPU 212 determines that the present timing is the end timing of the first slow charge (S255: Yes), this flow goes to S256. When the CPU 212 determines that the present timing is not the end timing of the first slow charge (S255: No), this flow returns to S254.

The CPU 212 at S256 determines whether all the sets of the slow charges which correspond to the charge parameter determined at S202 are completed. Since only the first slow charge is finished in this case (S256: No), this flow goes to S251 for the second fast charge.

When the fast charges and the slow charges of the sets determined at S202 are completed by repetition of the processings at S251-S256 (S253 or S256: Yes), this flow goes to S20.

Thus, the charge processing includes: the fast charge processing in which the battery power source BT is charged speedily at a relatively large current value; and the slow charge processing in which the battery power source BT is charged slowly at a relatively small current value. In the second charge mode, the CPU 212 executes the fast-and-slow-charge adjustment processing, as the charge processing, for adjusting (i) time allotment for each of the fast charge processing and the slow charge processing and (ii) the number of switches between the fast charge processing and the slow charge processing, in accordance with a period (eight hours) extending from the start of the new charge processing to the end timing of the new charge processing which is estimated by the execution history.

Thus, the CPU 212 executes the fast-and-slow-charge adjustment processing to increase or reduce the time allotment for each of the fast charge processing and the slow charge processing and to increase or reduce the number of switches between the fast charge processing and the slow charge processing. This enables execution of the charge processing in an appropriate manner for the particular charge pattern for each user when compared with the normal technique in which the charge processing is switched to the slow charge processing once after the fast charge processing is executed for a fixed length of time.

For example, the CPU 212 may switch the processing a plurality of times so as to execute the fast charge processing and the slow charge processing of the first set and the fast charge processing and the slow charge processing of the second set in this order. With this configuration, even if forced termination has unexpectedly occurred (for example, the charge-power receiving terminals 23, 24 are disconnected from the external power source AC) during the charge processing, at least a portion of the first fast charge processing is executed. This increases the charged capacity when compared with the medium-speed charge processing with the fixed speed.

While the embodiments have been described above, it is to be understood that the disclosure is not limited to the details of the illustrated embodiments, but may be embodied with various changes and modifications, which may occur to those skilled in the art, without departing from the spirit and scope of the disclosure.

(1) Power-Source Connector

While each of the charge-power receiving terminals 23, 24 serves as the power-source connector in the above-described embodiments, the electric-charge circuit 201 provided in the printing apparatus 3 may execute the electric charge in the case where the output plug of the power-source adapter, not illustrated, is inserted into the adapter-insertion opening 18, and the printing apparatus 3 is thereby connected to the external power source AC not via the power supplier 2, i.e., in a state in which the charge-power receiving terminals 23, 24 are not connected, for example. In this case, the adapter-insertion opening 18 serves as the power-source connector.

(2) Correction with Current Value

In the above-described embodiments, the CPU 212 executes the correcting processing so as to change the upper limit value (8.3 V) of the voltage range by −0.1 V for each time in the case of the fast charge, and change the lower limit value (8.3 V) of the voltage value by +0.1 V for each time in the case of the slow charge. However, the CPU 212 executes the correcting processing so as to change the current value (1000 mA in the above-described example) by −10 mA for each time in the case of the fast charge, and change the current value (100 mA in the above-described example) by 10 mA for each time in the case of the slow charge, for example. With this configuration, the CPU 212 does not use a single value though the temperature range is narrow particularly in the case of the slow charge when compared with the case where the voltage range is corrected.

(3) Manual Switching of Charge Mode

The function keys provided on the upper surface 4 of the printing apparatus 3 may further include a charge-mode selection key, not illustrated. In this case, the user may operate the charge-mode selection key to manually switch the charge mode among the first charge mode in which the CPU 212 executes the charge processing in the process in FIG. 8 in the first embodiment, the second charge mode in which the CPU 212 executes the charge processing in the process in FIG. 13 or 14 in the second embodiment, and a third charge mode in which the charge processing using the above-described conventional technique, for example.

In this third charge mode, for example, the processings at S11-S20 in FIG. 8 other than the processings at S18 and S19 may be executed using the charge parameters described in the conventional technique until the end of the fast charge and the slow charge.

(4) Others

While the printed-label tape 109 for which printing has been performed is cut by the cutting mechanism 140 including the fixed blade 141 and the movable blade 142 to create the printed label L in the above-described embodiments, the present disclosure is not limited to this configuration. For example, in the case where label mount sheets (what is called die-cut labels) separated in advance so as to each have a predetermined size corresponding to that of the label are arranged on a tape drawn from a roll, the printed label may be created by separating only the printed label mount sheet from the tape after the tape is discharged from the tape output opening 14, without cutting of the cutting mechanism 140. The present disclosure may be applied to this configuration.

While the terms "the same", "equal", "different", and the like are used for dimensions and sizes in external appearance in the above-described description, these terms are not strictly used. That is, tolerance and error in design and manufacture are allowed, and "same", "equal", and "different" may be respectively interpreted as "substantially the same", "substantially equal", and "substantially different".

Each arrow in FIG. 6 indicates one example of a flow of signals and does not limit a direction or directions of the flow of the signals.

Processings achieved by the present disclosure are not limited to the flows illustrated in FIGS. 8, 13, and 14. The processings may be added, removed, altered, combined, and reordered without departing from the spirit of the scope of the present disclosure.

The techniques in the above-described embodiments and modifications may be used in any combinations.

The disclosure is not limited to the details of the illustrated embodiments and modifications, but may be embodied with various changes and modifications, which may occur to those skilled in the art, without departing from the spirit and scope of the disclosure.

What is claimed is:

1. A printing apparatus, comprising:
   a battery accommodating portion configured to hold a battery power source that is chargeable;

a conveyor configured to be operable by electric power supplied from the battery power source, to convey a printing medium;

a printing device configured to be operable by electric power supplied from the battery power source, to perform printing on the conveyed printing medium;

a power-source connector configured to be connectable to an external power source;

an electric charger configured to charge the battery power source from the external power source when the power-source connector is connected to the external power source;

a degradation-degree detector configured to detect a degradation degree of the battery power source held in the battery accommodating portion; and a controller configured to execute:
  a charge processing in which the controller controls the electric charger using at least one charge parameter to charge the battery power source;
  a degradation-degree-data storing processing in which the controller stores data on the degradation degree of the battery power source based on a result of detection of the degradation-degree detector;
  a determining processing in which the controller determines whether a particular determination criterion relating to the degradation degree is satisfied in the data on the degradation degree which is stored in the degradation-degree-data storing processing; and
  a correcting processing in which the controller corrects the at least one charge parameter for the charge processing in accordance with a result of determination in the determining processing, wherein the controller is configured to:
  store the data on the degradation degree in the degradation-degree-data storing processing based on results of detections that are performed by the degradation-degree detector at a first particular interval while the charge processing is being executed;
  correct at least one of a voltage range, a current value, and a temperature range of the battery power source in the correcting processing, which at least one is used in the charge processing as the at least one charge parameter
  execute an average-increasing-rate-value calculating processing in which the controller calculates an average value of increasing rates of the degradation degree which are detected in a period from a start to an end of the charge processing;
  in the determining processing, identify the temperature range in which a value of an increasing rate of the degradation degree in a present charge processing as the charge processing is greater than an average value of increasing rates of the degradation degree in at least one previous charge processing as the charge processing, as the determination criterion; and
  correct the at least one charge parameter in the identified temperature range in the correcting processing.

2. The printing apparatus according to claim 1, wherein the controller is configured to:
  store the data on the degradation degree in the degradation-degree-data storing processing based on results of detections that are performed by the degradation-degree detector at a second particular interval while the charge processing is not being executed; and
  change the at least one charge parameter for the charge processing in the correcting processing so as to change the battery power source to a charged state in which a charged capacity is less than that in a fully charged state.

3. The printing apparatus according to claim 1, wherein the controller is configured to, in the correcting processing, change the temperature range to be used in the charge processing, so as to exclude the temperature range in which a ratio of the increasing rate in the present charge processing to the average value is greater than or equal to a first value in the identified temperature range.

4. The printing apparatus according to claim 3, wherein the controller is configured to change the temperature range in the correcting processing so as to reduce an upper limit value of the temperature range to be used in the charge processing.

5. The printing apparatus according to claim 3, wherein the controller is configured to, in the correcting processing, change one of the voltage range and the current value to be used in the charge processing, when the ratio of the increasing rate in the present charge processing to the average value is less than the first value and greater than or equal to a second value in the identified temperature range, and the second value is less than the first value.

6. The printing apparatus according to claim 5,
  wherein the charge processing comprises: a fast charge processing in which the controller controls the electric charger to charge the battery power source at a first current value for a first period; and a slow charge processing in which the controller controls the electric charger to charge the battery power source at a second current value less than the first current value, for a second period greater than the first period, and
  wherein the controller is configured to change the voltage range in the correcting processing so as to reduce an upper limit value of the voltage range in the fast charge processing.

7. The printing apparatus according to claim 5,
  wherein the charge processing comprises: a fast charge processing in which the controller controls the electric charger to charge the battery power source at a first current value for a first period; and a slow charge processing in which the controller controls the electric charger to charge the battery power source at a second current value less than the first current value, for a second period greater than the first period, and
  wherein the controller is configured to change the voltage range in the correcting processing so as to increase a lower limit value of the voltage range in the slow charge processing.

8. The printing apparatus according to claim 1, wherein the controller comprises, as a charge mode:
  a first charge mode in which the controller executes the degradation-degree-data storing processing, the determining processing, and the correcting processing; and
  a second charge mode in which the controller does not execute the degradation-degree-data storing processing, the determining processing, and the correcting processing and adjusts a manner of a new charge processing based on an execution history of the charge processing.

9. A printing apparatus, comprising:
  a battery accommodating portion configured to hold a battery power source that is chargeable;
  a conveyor configured to be operable by electric power supplied from the battery power source, to convey a printing medium;

a printing device configured to be operable by electric power supplied from the battery power source, to perform printing on the conveyed printing medium;
a power-source connector configured to be connectable to an external power source;
an electric charger configured to charge the battery power source from the external power source when the power-source connector is connected to the external power source; and
a controller configured to execute:
  a charge processing in which the controller controls the electric charger using at least one charge parameter to charge the battery power source,
  a degradation-degree-data storing processing in which the controller stores data on the degradation degree of the battery power source based on a result of detection of a degradation-degree detector;
  a determining processing in which the controller determines whether a particular determination criterion relating to the degradation degree is satisfied in the data on the degradation degree which is stored in the degradation-degree-data storing processing; and
  a correcting processing in which the controller corrects the at least one charge parameter for the charge processing in accordance with a result of determination in the determining processing,
wherein the controller comprises, as a charge mode:
  a first charge mode in which the controller executes the degradation-degree-data storing processing, the determining processing, and the correcting processing; and
  a second charge mode in which the controller does not execute the degradation-degree-data storing processing, the determining processing, and the correcting processing and adjusts a manner of a new charge processing based on an execution history of the charge processing,
wherein the charge processing comprises: a fast charge processing in which the controller controls the electric charger to charge the battery power source at a first current value for a first period; and a slow charge processing in which the controller controls the electric charger to charge the battery power source at a second current value less than the first current value, for a second period greater than the first period, and
wherein the controller is configured to execute, as the charge processing, a medium-speed charge processing in which the controller controls the electric charger to charge the battery power source at a current value that is less than the first current value for the fast charge processing and greater than the second current value for the slow charge processing, for a period extending from a start of the new charge processing to an end timing of the new charge processing which is estimated based on the execution history, and the period is greater than the first period for the fast charge processing and less than the second period for the slow charge processing.

10. A printing apparatus, comprising:
a battery accommodating portion configured to hold a battery power source that is chargeable;
a conveyor configured to be operable by electric power supplied from the battery power source, to convey a printing medium:
a printing device configured to be operable by electric power supplied from the battery power source, to perform printing on the conveyed printing medium:
a power-source connector configured to be connectable to an external power source;
an electric charger configured to charge the battery power source from the external power source when the power-source connector is connected to the external power source; and
a controller configured to execute:
  a charge processing in which the controller controls the electric charger using at least one charge parameter to charge the battery power source,
  a degradation-degree-data storing processing in which the controller stores data on the degradation degree of the battery power source based on a result of detection of a degradation-degree detector;
  a determining processing in which the controller determines whether a particular determination criterion relating to the degradation degree is satisfied in the data on the degradation degree which is stored in the degradation-degree-data storing processing; and
  a correcting processing in which the controller corrects the at least one charge parameter for the charge processing in accordance with a result of determination in the determining processing,
wherein the controller comprises, as a charge mode:
  a first charge mode in which the controller executes the degradation-degree-data storing processing, the determining processing, and the correcting processing; and
  a second charge mode in which the controller does not execute the degradation-degree-data storing processing, the determining processing, and the correcting processing and adjusts a manner of a new charge processing based on an execution history of the charge processing,
wherein the charge processing comprises: a fast charge processing in which the controller controls the electric charger to charge the battery power source at a first current value for a first period; and a slow charge processing in which the controller controls the electric charger to charge the battery power source at a second current value less than the first current value, for a second period greater than the first period, and
wherein the controller is configured to execute, as the charge processing, a fast-and-slow-charge adjustment processing in which the controller adjusts time allotment for each of the fast charge processing and the slow charge processing and the number of switches between the fast charge processing and the slow charge processing, in the second charge mode, based on a period extending from a start of the new charge processing to an end timing of the new charge processing which is estimated based on the execution history.

* * * * *